(12) United States Patent
Carrico et al.

(10) Patent No.: US 11,860,432 B2
(45) Date of Patent: Jan. 2, 2024

(54) DEVICES, ASSEMBLIES AND METHODS FOR ANCHORING COMPONENTS OF TELECOMMUNICATIONS CABLES

(71) Applicant: COMMSCOPE TECHNOLOGIES LLC, Hickory, NC (US)

(72) Inventors: William Alan Carrico, Raleigh, NC (US); Barry Wayne Allen, Siler City, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 188 days.

(21) Appl. No.: 17/435,649

(22) PCT Filed: Feb. 26, 2020

(86) PCT No.: PCT/US2020/019818
§ 371 (c)(1),
(2) Date: Sep. 1, 2021

(87) PCT Pub. No.: WO2020/180550
PCT Pub. Date: Sep. 10, 2020

(65) Prior Publication Data
US 2022/0146770 A1 May 12, 2022

Related U.S. Application Data

(60) Provisional application No. 62/812,425, filed on Mar. 1, 2019.

(51) Int. Cl.
*G02B 6/44* (2006.01)

(52) U.S. Cl.
CPC ......... *G02B 6/4453* (2013.01); *G02B 6/4471* (2013.01)

(58) Field of Classification Search
CPC .................................................. G02B 6/4453
See application file for complete search history.

(56) References Cited

U.S. PATENT DOCUMENTS

| 4,815,808 A | 3/1989 | Honma et al. |
| 4,823,167 A | 4/1989 | Manska et al. |

(Continued)

FOREIGN PATENT DOCUMENTS

| JP | 2008-107602 A | 5/2008 |
| JP | 2009-104069 A | 5/2009 |

(Continued)

OTHER PUBLICATIONS

International Search Report and Written Opinion of the International Searching Authority for International Patent Application No. PCT/US2020/019818 dated Jun. 22, 2020, 10 pages.

(Continued)

*Primary Examiner* — Sung H Pak
(74) *Attorney, Agent, or Firm* — Merchant & Gould P.C.

(57) ABSTRACT

Devices, assemblies, and methods for anchoring portions of telecommunications cables, including protective sheaths and strength members. In some examples, the devices and assemblies are adjustable to accommodate different sized cables and cable components. According to one embodiment, an assembly includes two members that cooperate via a ratcheting mechanism to adjust to different cable diameters, the assembly further including features adapted to anchor strength member yarn of a cable.

30 Claims, 27 Drawing Sheets

(56) References Cited

U.S. PATENT DOCUMENTS

| | | | | |
|---|---|---|---|---|
| 5,418,874 | A | | 5/1995 | Carlisle et al. |
| 5,530,785 | A | * | 6/1996 | Sakamoto ............ G02B 6/4471 |
| | | | | 385/100 |
| 6,687,450 | B1 | | 2/2004 | Kempeneers et al. |
| 2010/0092147 | A1 | | 4/2010 | Desard et al. |
| 2010/0183270 | A1 | * | 7/2010 | Davis ................... G02B 6/4471 |
| | | | | 385/100 |

FOREIGN PATENT DOCUMENTS

| | | | | |
|---|---|---|---|---|
| WO | 02/97505 A1 | | 12/2002 | |
| WO | WO-2012074684 A2 | * | 6/2012 | ........... G02B 6/4477 |
| WO | 2013/037746 A1 | | 3/2013 | |
| WO | 2013/149846 A1 | | 10/2013 | |
| WO | 2014/207210 A1 | | 12/2014 | |
| WO | 2016/110246 A1 | | 7/2016 | |
| WO | 2016/167325 A1 | | 10/2016 | |
| WO | WO-2016167325 A1 | * | 10/2016 | ............... G02B 6/36 |
| WO | 2017/046359 A1 | | 3/2017 | |

OTHER PUBLICATIONS

Extended European Search Report for Application No. 20766533.2 dated Nov. 8, 2022.
Drawing of a telecommunications drawer and drawing of a portion of the telecommunications drawer, 1 page (Admitted prior art as of Mar. 1, 2019).
Pages of a product catalog, including images of telecommunications trays, Hellermann Tyton Data Ltd., pp. 1-6 (2015).

* cited by examiner

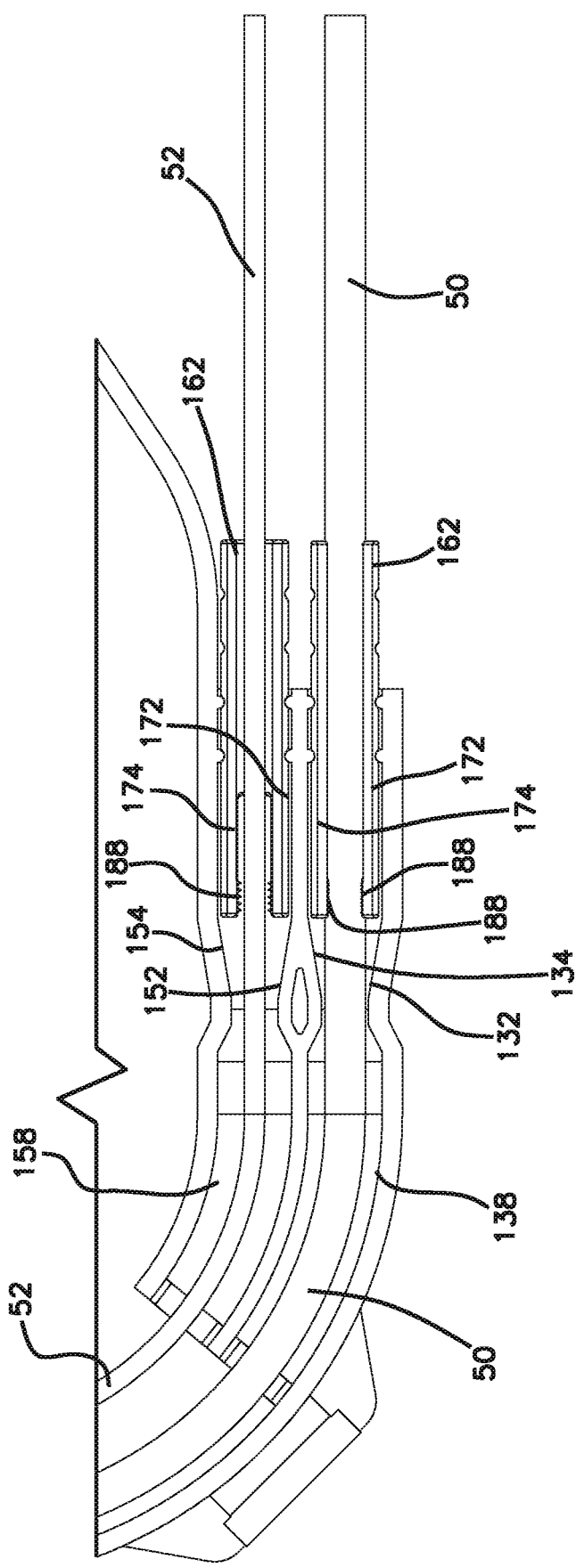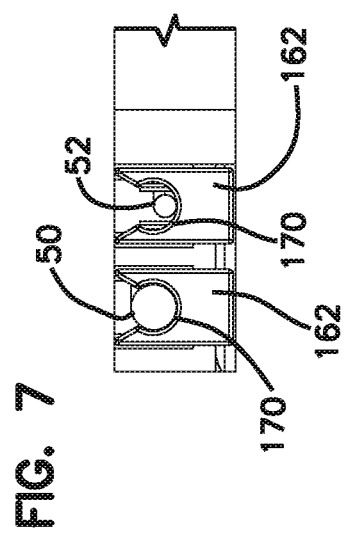

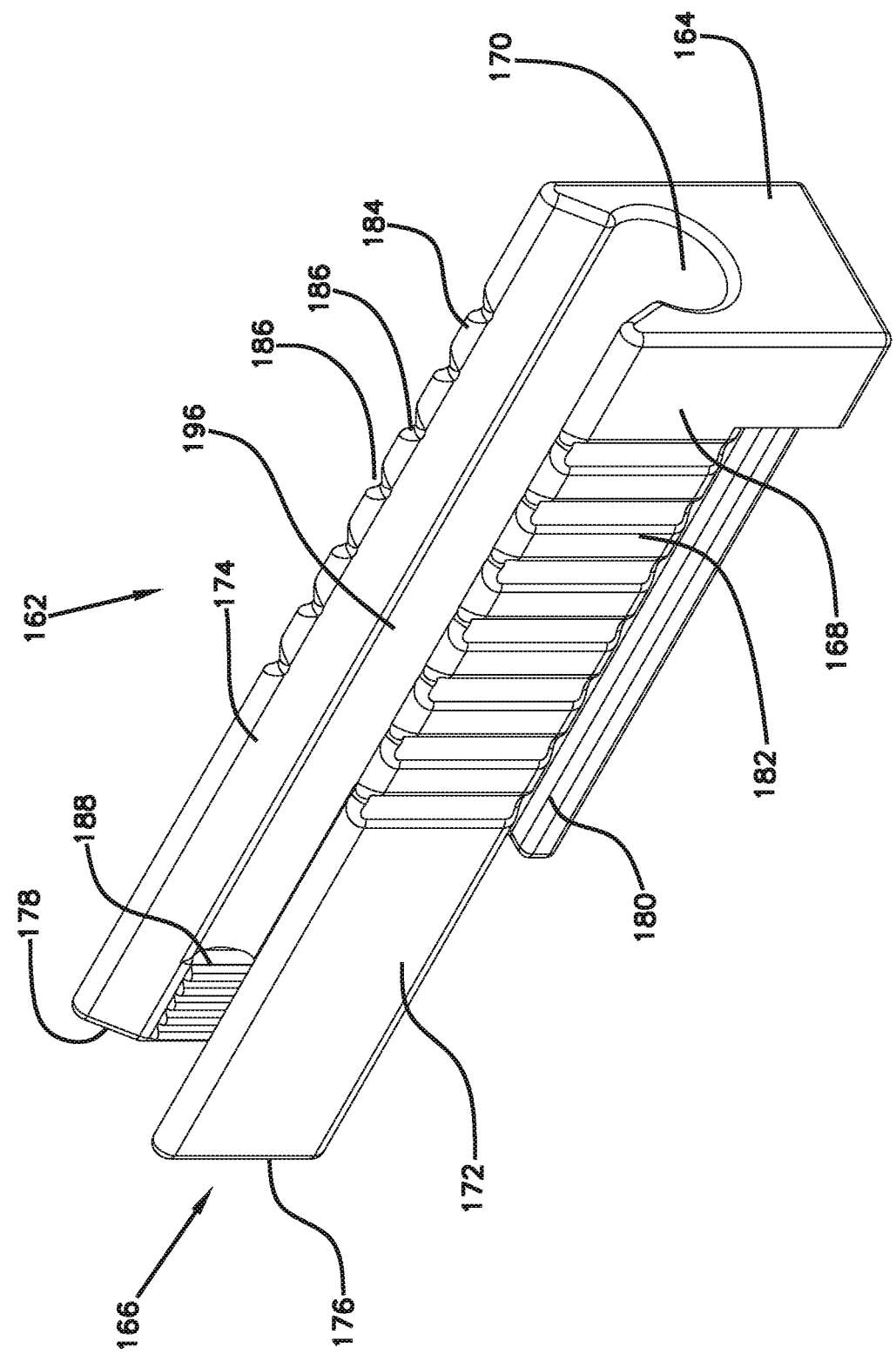

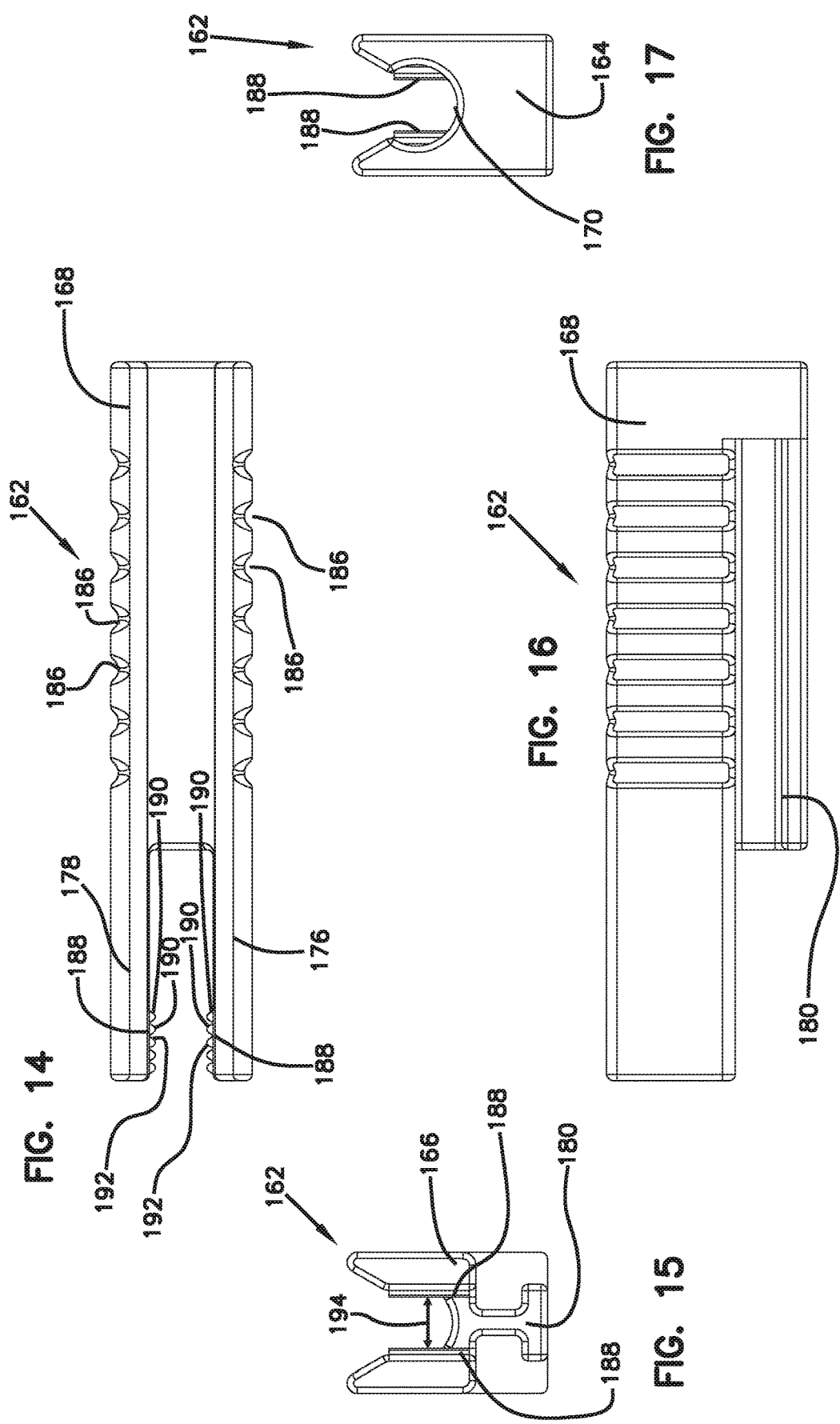

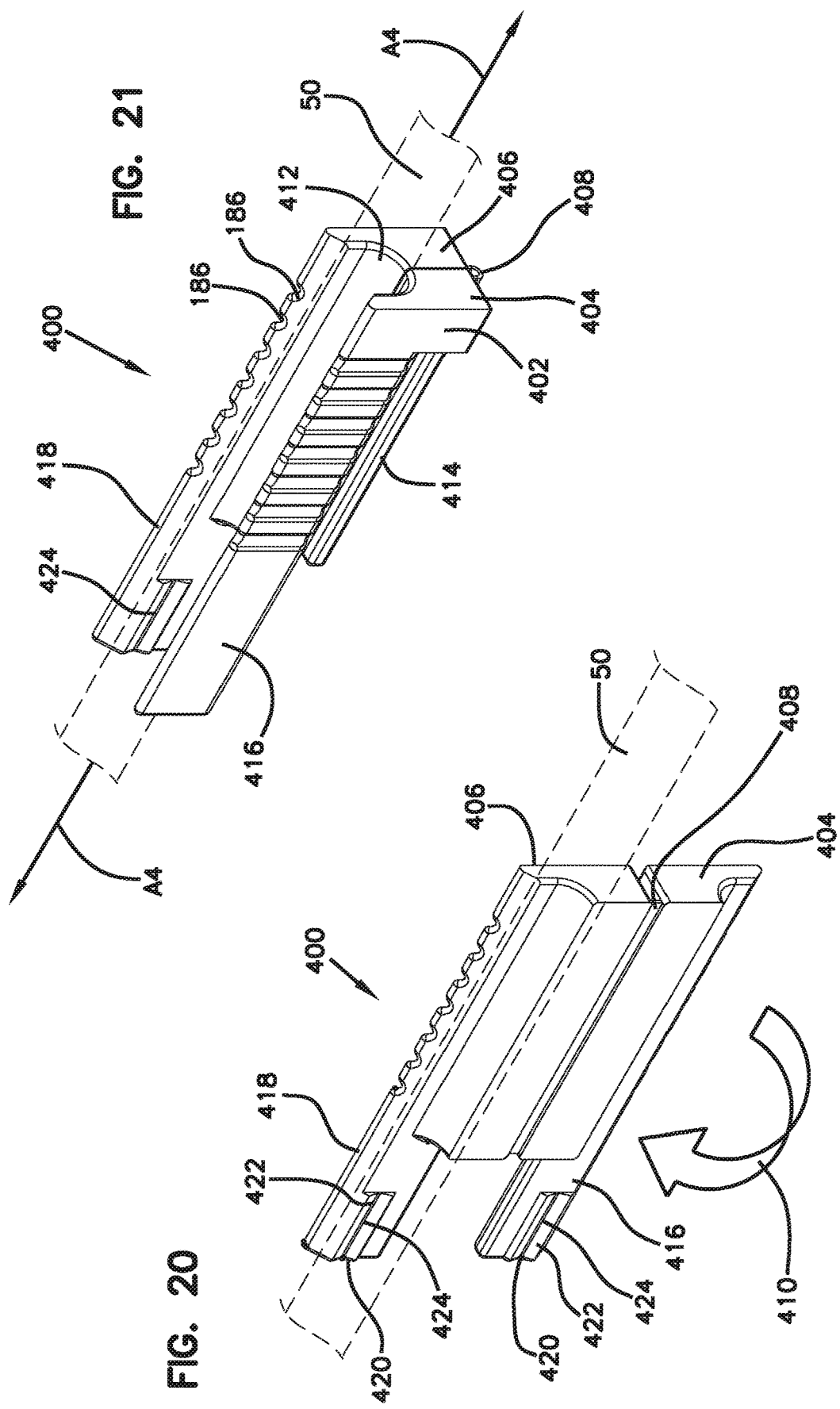

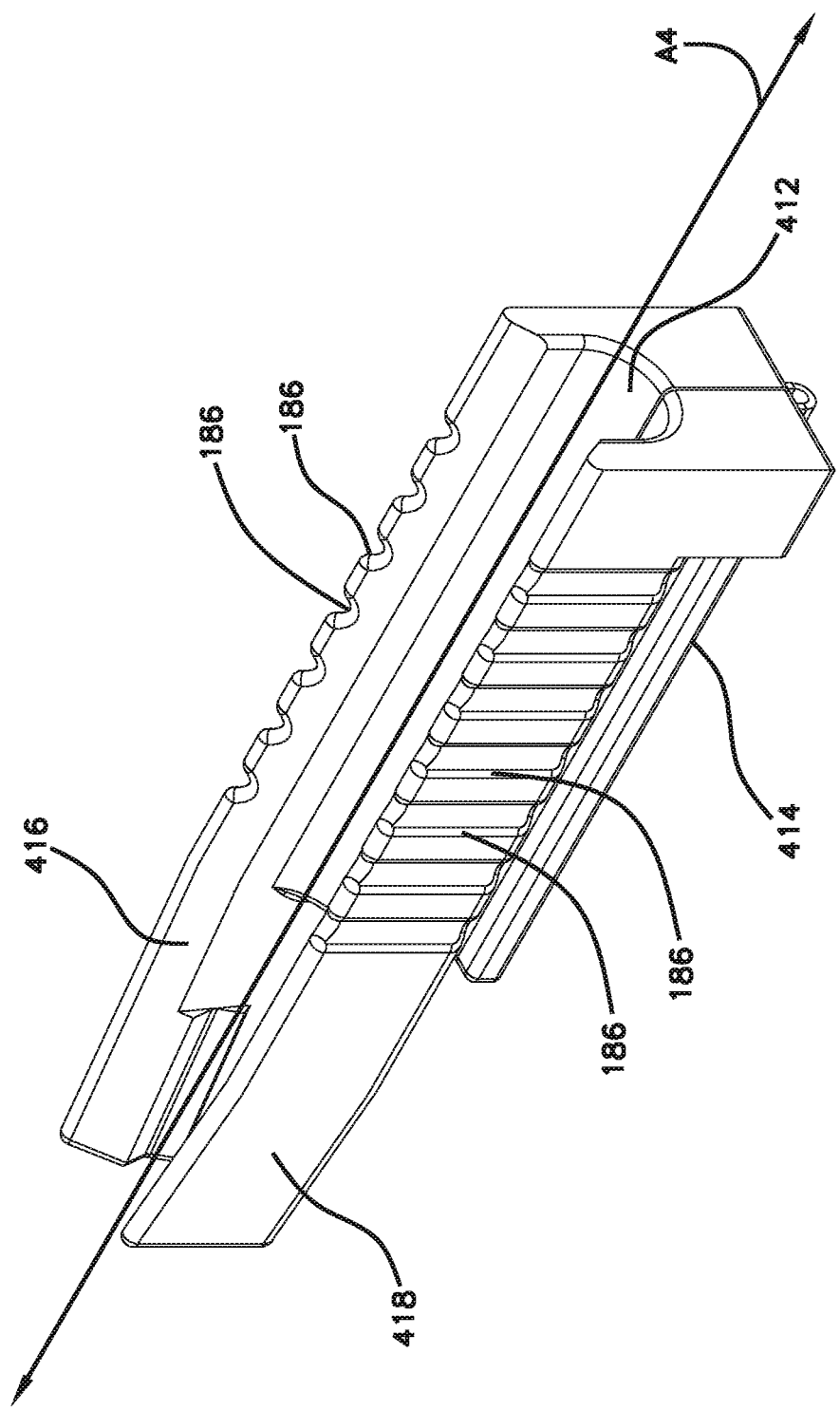

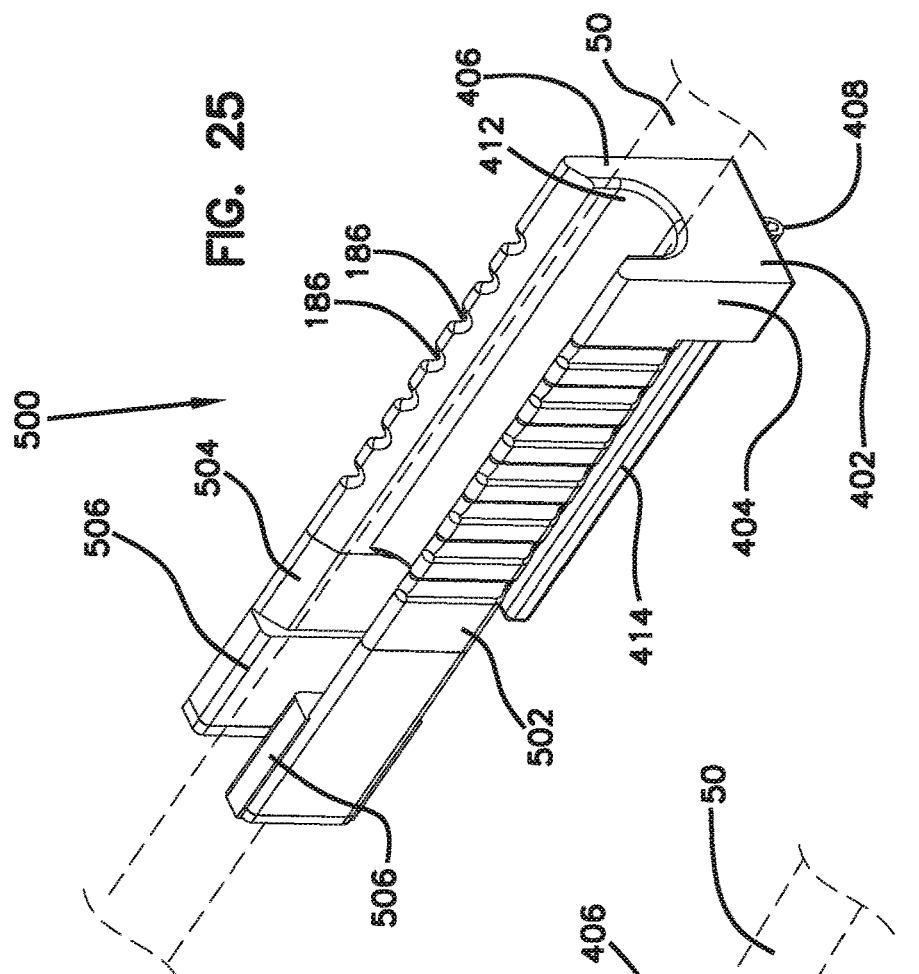
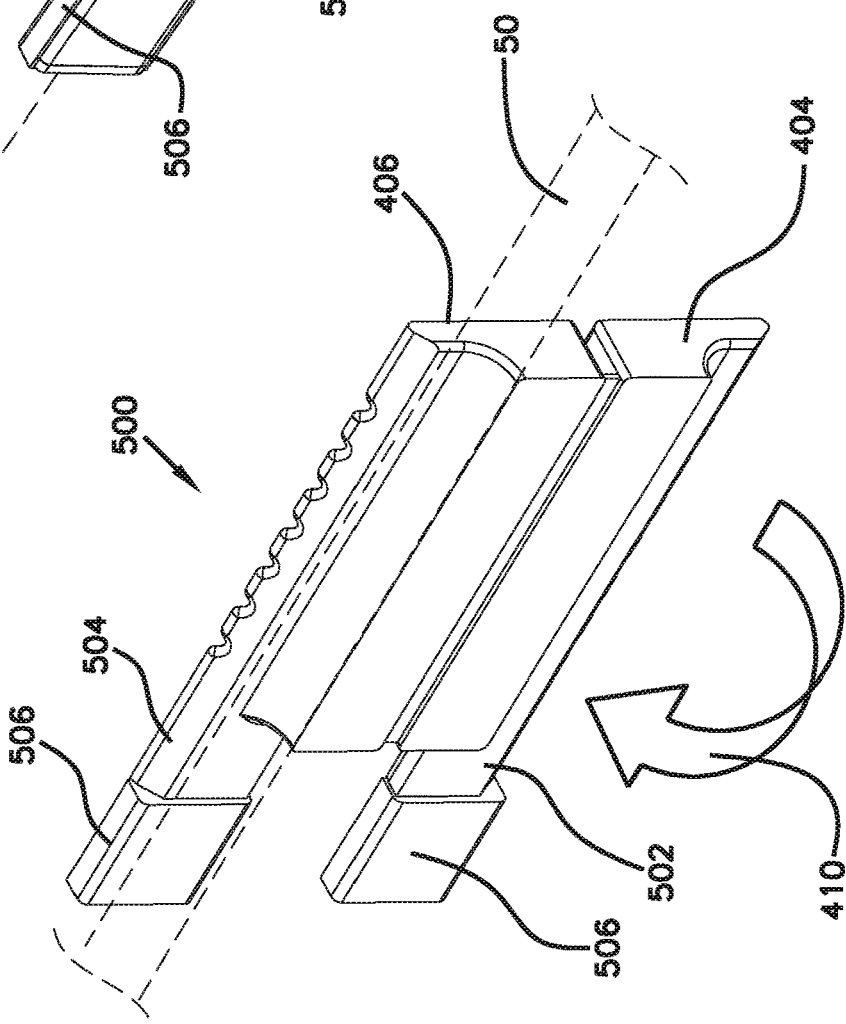

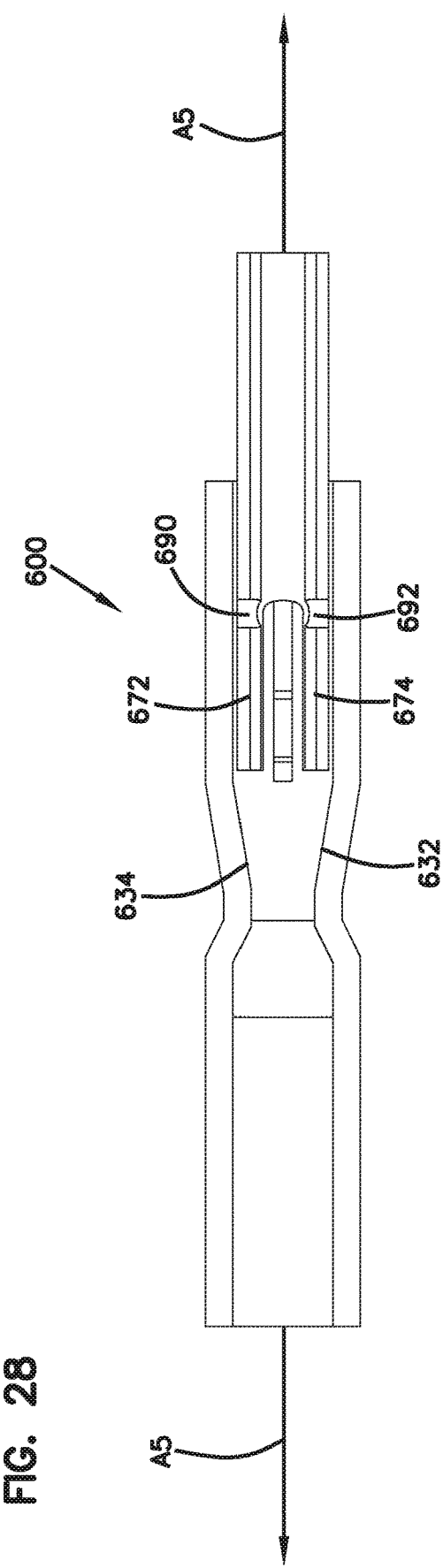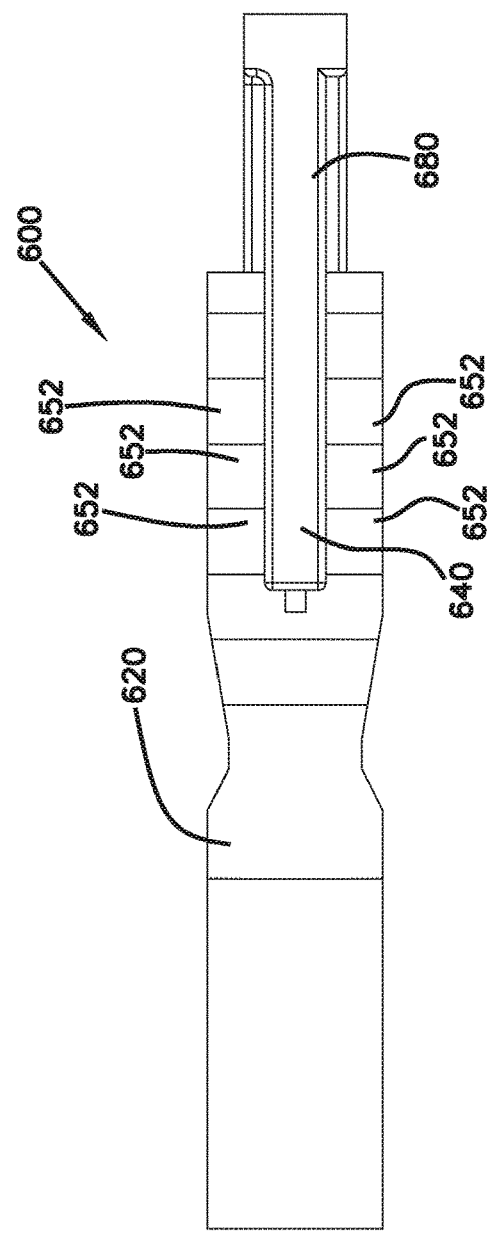

DEVICES, ASSEMBLIES AND METHODS FOR ANCHORING COMPONENTS OF TELECOMMUNICATIONS CABLES

CROSS-REFERENCE TO RELATED APPLICATION

This application is a National Stage Application of PCT/US2020/019818, filed on Feb. 26, 2020, which claims the benefit of U.S. Patent Application Ser. No. 62/812,425, filed on Mar. 1, 2019, the disclosures of which incorporated herein by reference in their entireties. To the extent appropriate, a claim is made to each of the above disclosed applications.

BACKGROUND

Fiber optic cables hold optical fibers used to carry optical signals to and from telecommunications equipment. Typically, larger cables, such as feeder cables, carry a relatively large number of fibers. The fibers of the feeder cable are spliced, split, optically connected to other fibers (e.g., via fiber optic connectors), or otherwise managed and routed to a desired destination, (e.g., a subscriber location) via smaller cables, such as drop cables, patch cords, etc. Due to the large number of fibers that need to be managed and routed, the feeder cable is often terminated at distribution and/or cable management equipment, such as a closure, terminal, rack, panel, cabinet, wall outlet or box at a customer premises, etc. The equipment can be adapted for outdoor or below grade use (e.g., in the form of a ruggedized and sealed re-enterable closure) or indoor use. The equipment typically includes structures and devices to organize and route cables and fibers to facilitate both storing of cable slack and routing of cables to their desired destinations.

To perform routing operations at distribution or other management equipment, it is often needed to fix parts of cables, such as protective tubes and strength members, to surfaces or other structures and devices so that the terminal portions of these cable portions do not interfere with fiber routing. In addition, fixing of cable portions auxiliary to the fibers themselves (such as protective tubes and strength members) can provide the additional benefit of absorbing or redistributing external loads away from the fragile optical fibers, thereby preserving the optical fibers' performance.

There is a need for improvements in the fixation of telecommunications cable components at distribution or other management equipment.

SUMMARY

In general terms the present disclosure is directed to securing (also referred to herein as fixing or anchoring) of telecommunications cable components to management equipment. The cables can carry one or more electrical and/or optical signal conduits for transmitting electrical and optical signals, respectively. Electrical conduits are typically in the form of metal wires, such as copper wires. Optical signal conduits come in the form of glass or plastic fibers. The bare fibers are typically cladded and coated. As used herein, the term "optical fiber" includes a bare optical fiber, a coated optical fiber, a cladded and coated optical fiber, and may also include one or more additional protective layers or components, such as an inner sheath of a cable or a buffer tube. Optical fibers can be managed on management equipment as individual fibers or as a groups of individual fibers, such as groups of multiple loose fibers or groups of linked fibers, such as ribbonized fibers. Although the specific embodiments described herein will reference optical fibers, the principles of the present disclosure can be readily applied to cables carrying other signal conduits as well, such as electrical conduits.

Protective tubes (also referred to herein as sheaths) carried by the cables themselves, or introduced separately from the cables at the management equipment, can be used at or near management equipment to protect lengths of optical fibers that may otherwise be exposed to potentially damaging or performance-impacting stress, the fibers being led through such tubes. The tubes are generally flexible and do not readily conduct electricity; for example, the tubes can be made of a polymeric material. However, end portions of the tubes must be anchored so that they do not interfere with the optical fibers and so that external loads can be directed away from the optical fibers through the anchoring of the tubes to another structure. Aspects of the present disclosure provide for anchoring of such tubes.

Some telecommunications cables include one or more strength members within the outer jacket. The strength member adds rigidity and resistivity to external loads and thereby protects the fragile optical fibers from such loads. When a cable containing a strength member is terminated at or near management equipment such that fibers carried by the cable can be managed on the management equipment, the strength members, like the cable's outer jacket (and potentially other components depending on the type of cable), is truncated. In some examples, an exposed portion of the strength member near the truncation point must be anchored so that it does not interfere with the optical fibers and so that external loads can be directed away from the optical fibers through the anchoring of the strength member to another structure. In some examples, the strength member includes a fibrous material, such as strands of aramid (e.g., Kevlar®) yarn. Aspects of the present disclosure provide for anchoring of such fibrous material.

In accordance with certain aspects of the present disclosure, an adjustable fixation assembly for fixing a fiber optic sheath comprises: a holder, the holder including a body defining a seat for the fiber optic sheath, and including a first coupler and a pair of gripper arms, the pair of gripper arms extending from the body; and a receptacle, the receptacle including: a second coupler adapted to cooperate with the first coupler to connect the holder and the receptacle at a plurality of positions along a first axis; and a pair of walls, the walls having ramped portions adapted to engage the gripper arms to flex the gripper arms towards each other as the holder is axially advanced in the receptacle.

In accordance with further aspects of the present disclosure, an assembly comprises: one or more optical fibers; a fiber optic sheath radially surrounding the one or more optical fibers, the fiber optic sheath having an end beyond which the one or more optical fibers extend; and an adjustable fixation subassembly for fixing the fiber optic sheath, the subassembly comprising: a holder, the holder including a body defining a seat supporting the fiber optic sheath, and including a first coupler and a pair of gripper arms, the pair of gripper arms extending from the body; and a receptacle, the receptacle including a second coupler cooperating with the first coupler to connect the holder and the receptacle at one of a plurality of positions along a first axis; and a pair of walls, the walls having ramped portions engaging the gripper arms and flexing the gripping arms towards each other to grip an outer surface of the sheath.

In accordance with further aspects of the present disclosure, a method of fixing a fiber optic sheath to a receptacle comprises: providing a holder, the holder including a body defining a seat for the fiber optic sheath, and including a first coupler and a pair of gripper arms, the pair of gripper arms extending from the body; providing a receptacle, the receptacle including: a second coupler adapted to cooperate with the first coupler to connect the holder and the receptacle at a plurality of positions along a first axis; and a pair of walls, the walls having ramped portions adapted to engage the gripper arms to flex the gripper arms towards each other as the holder is axially advanced in the receptacle; loading the sheath into the holder; coupling together the first and second couplers; and axially advancing the holder relative to the receptacle until the pair of gripper arms grip an exterior surface of the sheath.

In accordance with still further aspects of the present disclosure, a method of anchoring a strength member of a telecommunications cable, the strength member including an exposed portion extending beyond an end of a sheath of the telecommunications cable, comprises: providing a holder extending from a proximal end to a distal end along a first axis, the holder including a body defining a through passage extending between the proximal and distal ends and a seat for the sheath of the telecommunications cable, and including a first coupler and a pair of gripper arms, the pair of gripper arms extending from the body, the gripper arms defining, respectively, first and second pairs of notches on opposing sides of the holder; providing a receptacle, the receptacle including a second coupler adapted to cooperate with the first coupler to connect the holder and the receptacle at a plurality of positions along the first axis; loading the sheath into the holder; anchoring the strength member to the holder, the anchoring including: a first routing of a first portion of the exposed portion of the strength member through the first pair of notches and the second pair of notches such that at least one loop of the exposed portion of the strength member is formed, the at least one loop fully surrounding the first axis; and subsequent to the first routing, a second routing of a second portion of the exposed portion of the strength member through a portion of the thorough passage and out the one of the proximal end or distal end of the holder; and subsequent to the anchoring, coupling together the first and second couplers.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

FIG. 6 is a top view of the portion of the management equipment of FIG. 5.

FIG. 7 is a proximal end view of the portion of the management equipment of FIG. 5.

FIG. 13 is a perspective view of a holder of the anchoring assembly of FIG. 3.

FIG. 14 is a top view of the holder of FIG. 13.

FIG. 15 is a distal end view of the holder of FIG. 13.

FIG. 16 is a side view of the holder of FIG. 13.

FIG. 17 is a proximal end view of the holder of FIG. 13.

FIG. 20 is a perspective view of a further embodiment of a holder of an anchoring system in accordance with the present disclosure, the holder being in a loading configuration.

FIG. 21 is a perspective view of the holder of FIG. 20, the holder being in a loaded or first holding configuration.

FIG. 23 is a perspective view of the holder of FIG. 20, the holder being in a second holding configuration.

FIG. 24 is a perspective view of a further embodiment of a holder of an anchoring system in accordance with the present disclosure, the holder being in a loading configuration.

FIG. 25 is a perspective view of the holder of FIG. 24, the holder being in a loaded or holding configuration.

FIG. 28 is a top view of the assembly of FIG. 26.

FIG. 29 is a bottom view of the assembly of FIG. 26.

DETAILED DESCRIPTION

Figure 2:
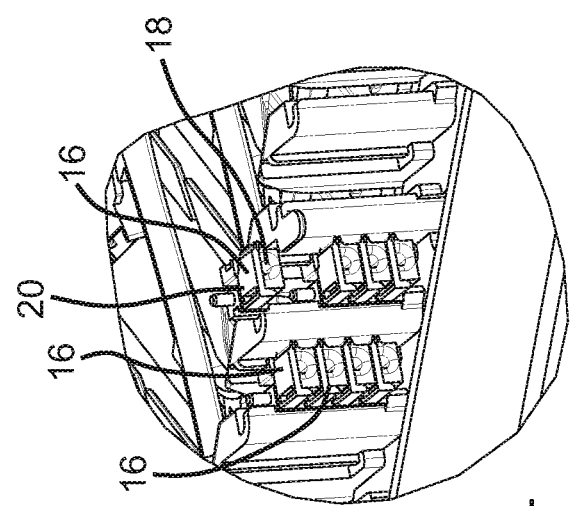
FIG. 2 is an enlarged view of a portion of the prior art management equipment of FIG. 1.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. In addition, it should be appreciated that features of one embodiment may be included in another embodiment, such that the specific combinations of features depicted by the drawings is not necessarily limiting.

Figure 1:
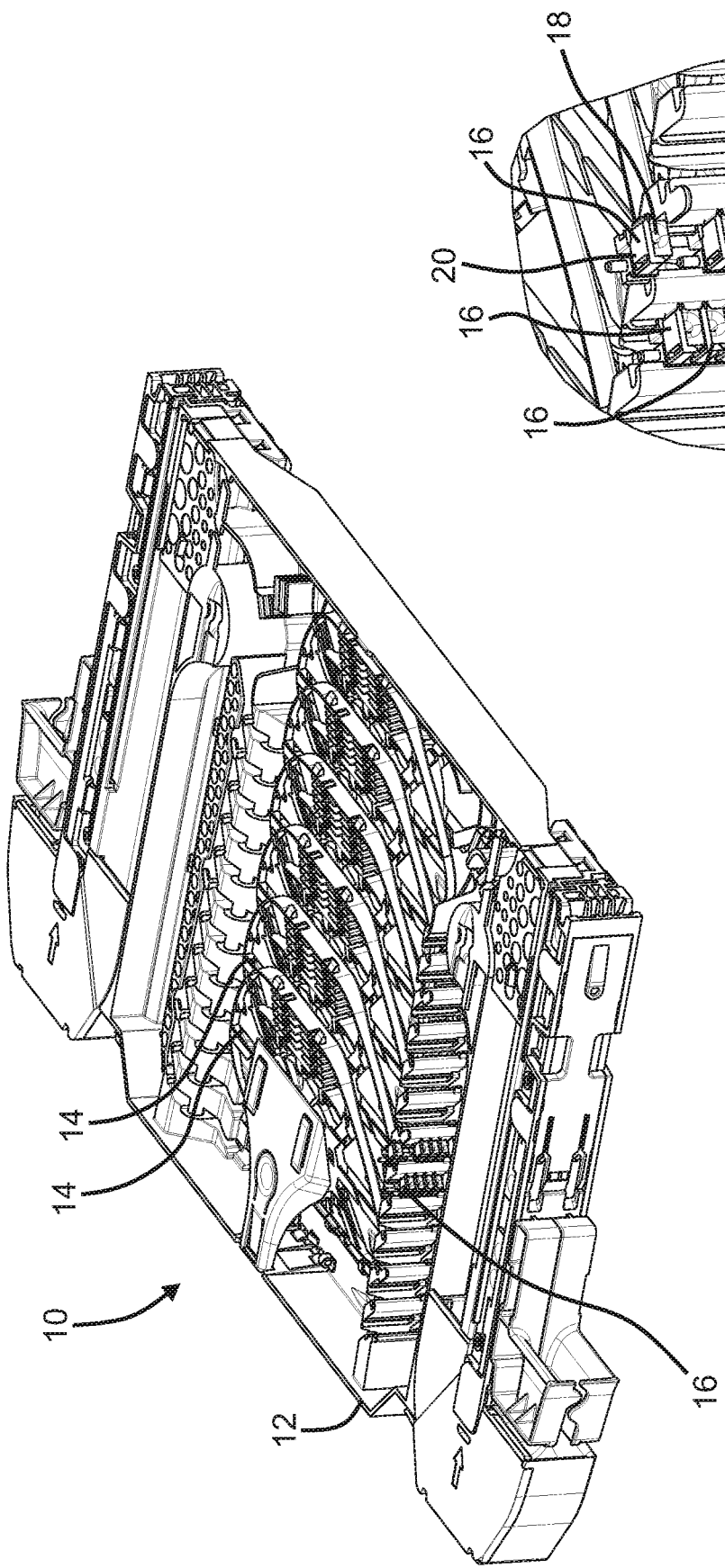
FIG. 1 is a perspective view of prior art telecommunications management equipment.

Referring to FIGS. 1-2, example prior art telecommunications management equipment 10 includes a drawer 12. The drawer 12 can be, e.g., slidably mounted to a rack at an optical signal distribution site. The drawer 12 supports a plurality of fiber management trays 14. Each tray 14 defines areas and/or structures, and/or supports devices that can, e.g., spool lengths (i.e., slack) of optical fiber, splice optical fibers together, split optical fibers, index optical fibers, optically couple together connectorized optical fibers, etc. Optical fibers enter the trays 14 via termination devices 16. A distal end portion of an outer jacket of a cable is stripped, exposing the optical fiber and aramid yarn that enhances the strength of the cable. The optical fiber is passed through the passage 18 defined by the termination device 16 and onto one of the trays 14. The passage 18 receives the end portion of the stripped jacket and includes a hinged clip 20 for holding the aramid yarn. Optical fiber termination units are further described in International Patent Publication Number WO 02/097505, the contents of which are hereby incorporated by reference in their entirety.

Referring now to FIGS. 3-42, cable component anchoring devices, assemblies and methods that help to alleviate one or more drawbacks of prior optical fiber termination solutions will be described.

Referring to FIGS. 3-9 a piece of telecommunications cable management equipment 100 is shown. In this example, the equipment is a fiber management tray 100. In other examples, the equipment can be, e.g., a panel, a drawer, a closure, a cabinet, a splice terminal, a wall outlet, or a box at a customer premises, etc.

Optical fibers enter the tray 100 at entry areas 102, 104. In this example, the entry areas 102 and 104 are configured differently with respect to the receptacles defined by the entry areas 102 and 104. In other examples, the receptacles of the entry area 104 have the same configuration as the receptacles of the entry area 104. Once fibers pass through an entry area 102, 104, they can be managed on the tray in a first region 106 and/or a second region 108. The first region 106 can support one or more structures or devices to couple the optical fibers to other optical fibers entering the tray. Such structures or devices can include, e.g., splice holders, splitters, adapters that receive connectors that terminate fibers, etc. The second region 108 includes spooling structures for storing fiber slack and defines channels for routing optical fibers along desired paths. The tray 100 also includes pins 110 that enable the tray 100 to be pivotally coupled to a support structure, such as a tray support tower of a telecommunications closure or a support structure of a drawer that slidably mounts to a rack at an optical signal distribution site.

Figure 3:
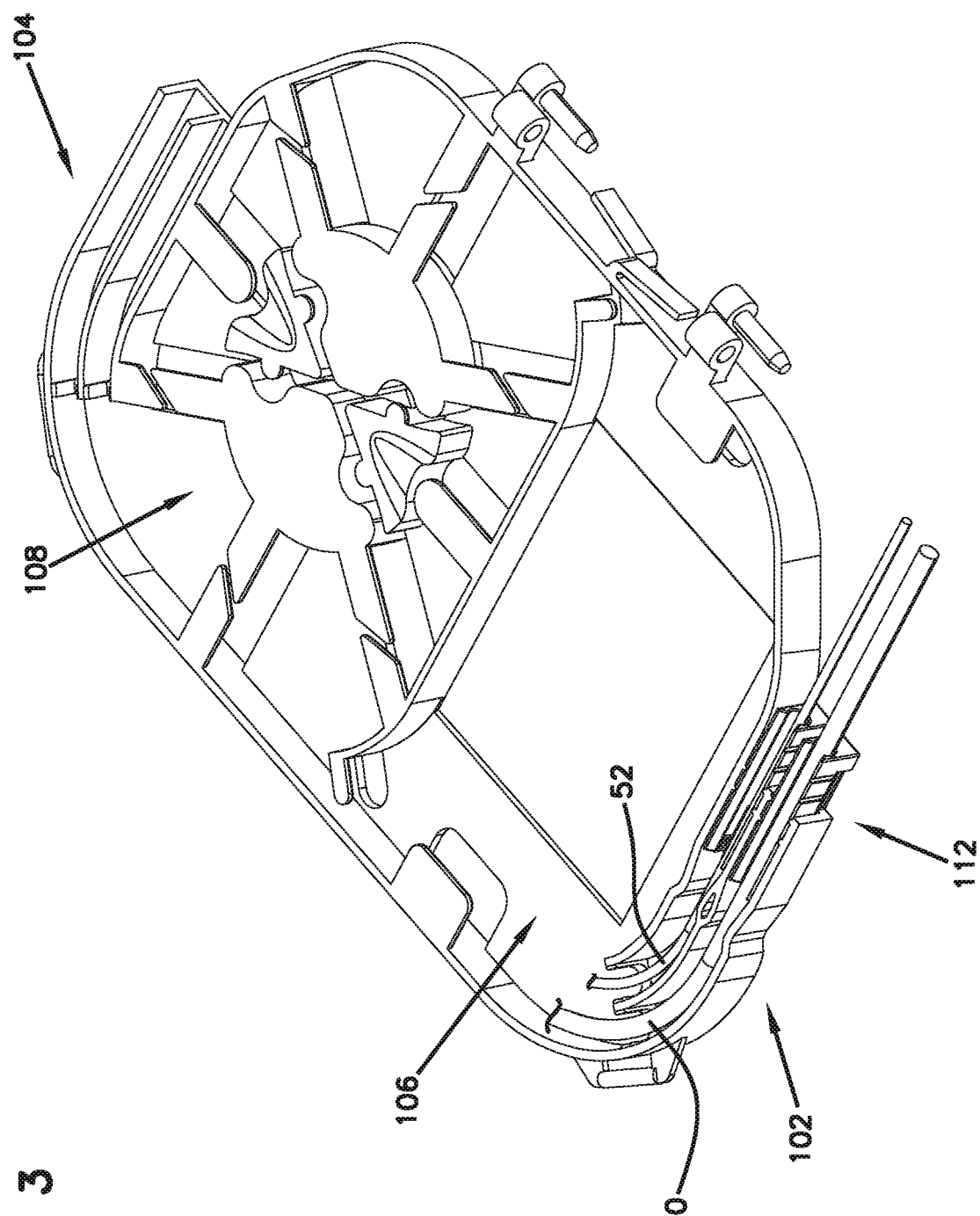
FIG. 3 is a perspective view of telecommunications management equipment, including an embodiment of an anchoring assembly in accordance with the present disclosure, the anchoring assembly being in a first configuration.
Figure 4:
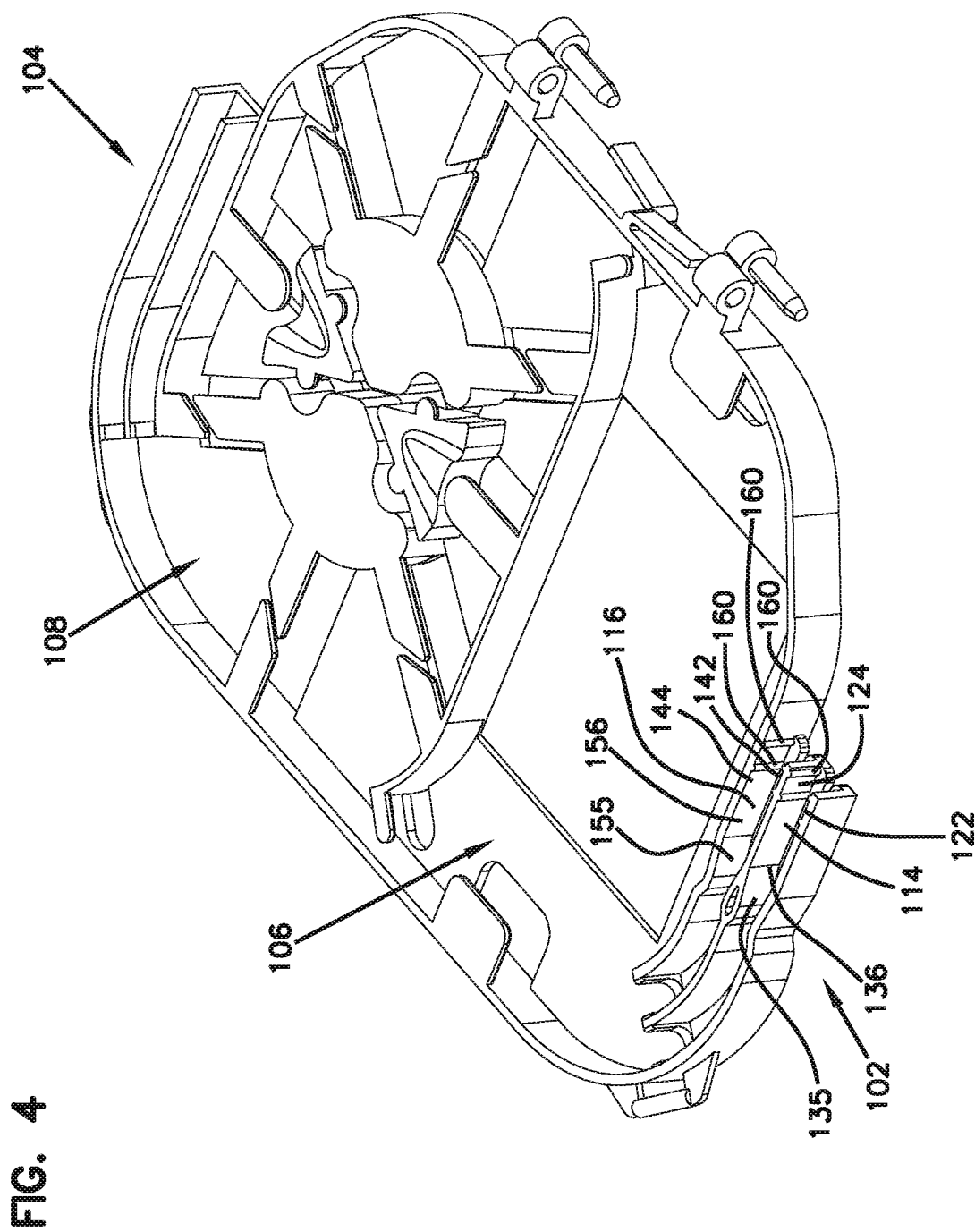
FIG. 4 is a perspective view of the management equipment of FIG. 3, with portions of the anchoring assembly removed.
Figure 5:
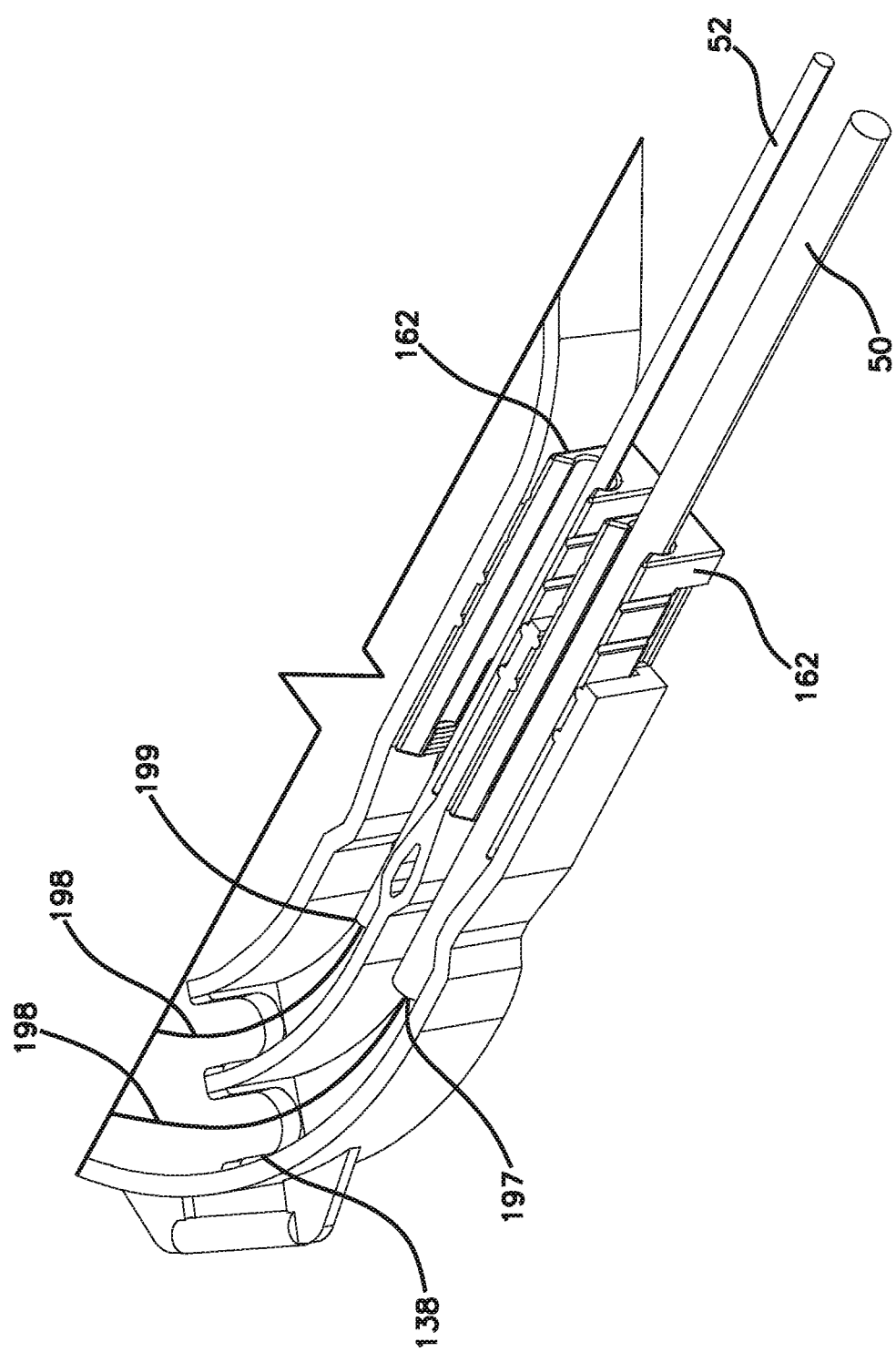
FIG. 5 is a perspective view of a portion of the management equipment of FIG. 3.
Figure 8:
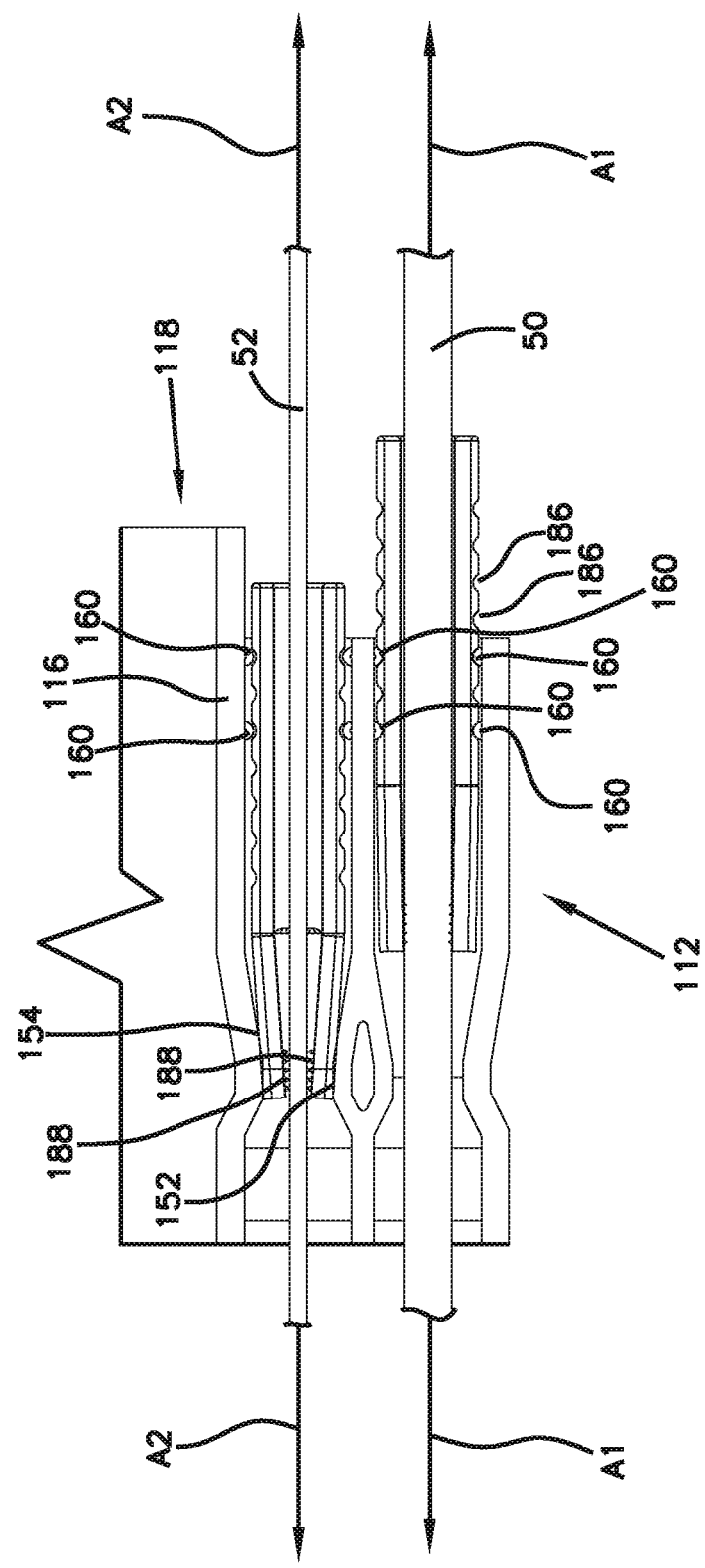
FIG. 8 is a top view of a portion of the portion of the management equipment of FIG. 5, the anchoring assembly being in a second configuration.
Figure 9:
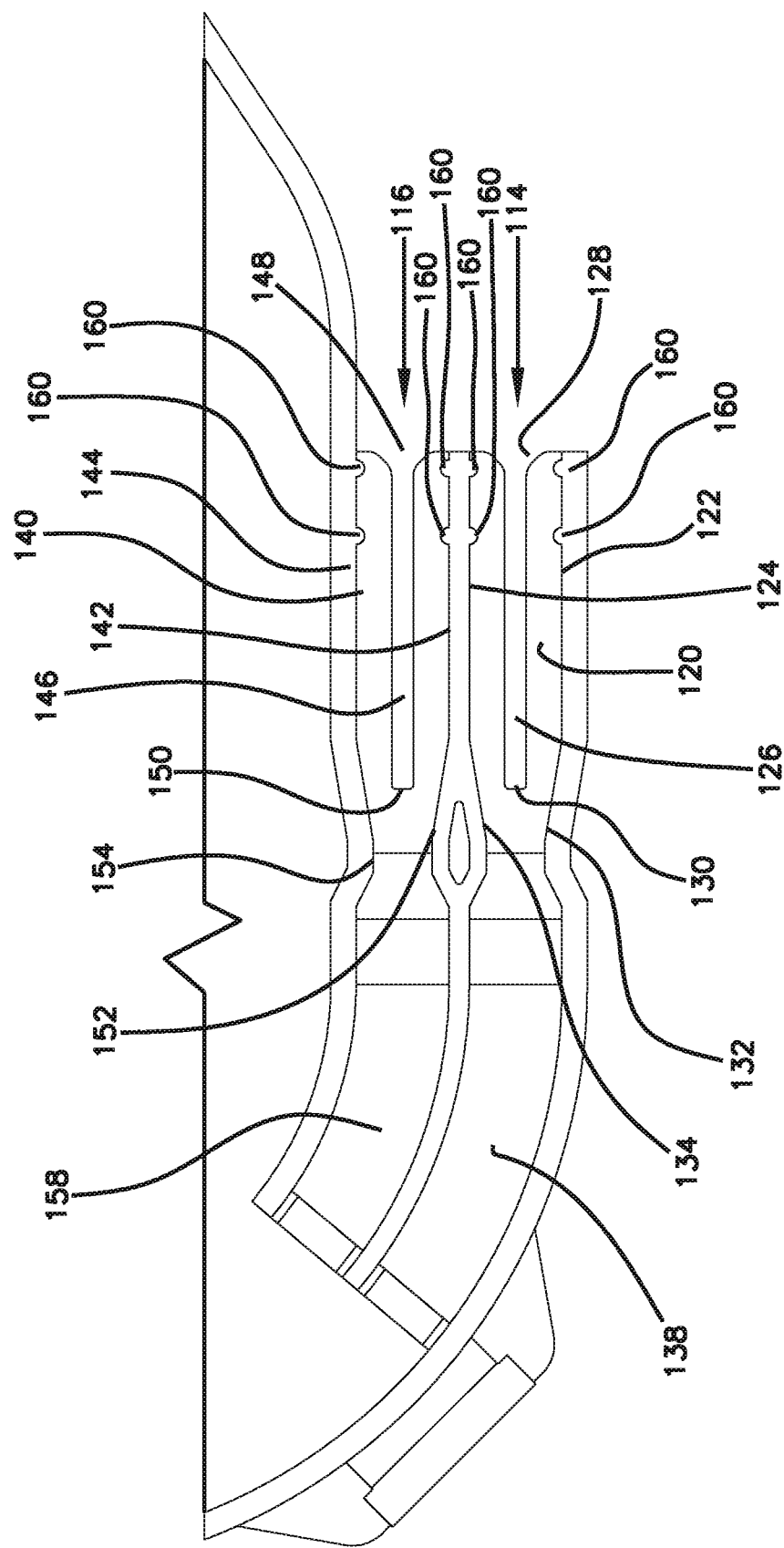
FIG. 9 is a top view of the portion of the management equipment of FIG. 4, with portions of the anchoring assembly removed.

The entry area 102 includes a portion of an anchoring assembly 112. The anchoring assembly 112 includes one or more receptacles, in this case two receptacles 114 and 116. The assembly 112 extends distally from a proximal end 118 along the axes A1 and A2 defined by the receptacles 114 and 116, respectively. In some examples, the receptacles are made from a polymeric material. Any number of receptacles can be ganged together depending on the needs of particular management. In the embodiment of FIG. 3, two receptacles 114 and 116 are ganged together. In other examples, receptacles can be singular, or ganged in groups of 3, 4, 5, 6, 7, 8, or more. Receptacles can be ganged together horizontally (as in the case of the receptacles 114 and 116) and/or vertically, i.e., with receptacles being placed above or below other receptacles.

The receptacle 114 includes a bottom wall 120 and two opposing side walls 122 and 124 extending upwards from the bottom wall 120. The bottom wall 120 includes an elongate slot 126 extending distally from a proximal open end 128 to a distal closed end 130. In this example, the proximal open end 128 is trumpet shaped, narrowing in the proximal to distal direction, which can facilitate insertion of a holder track into the slot 126. Each of the side walls 122, 124 includes a ramp 132, 134. The ramps 132, 134 incline towards each other and towards the axis A1 as they extend distally, forming a neck region 135 of holder receiving volume 136, which is itself defined by the side walls 122 and 124 and bottom wall 120 of the receptacle 114. Distally from the ramps 132, 134, the bottom wall 120 and side walls 122, 124 define a guide channel 138, the guide channel adapted to receive and guide a distal portion of a tube and/or a distal portion of a cable jacket, where a portion of one or more optical fibers extend from a distal end of a tube or cable jacket. The guide channel 138 opens onto the first region 106. In some examples, the distal ends 197, 199 of the sheath held by a holder and receptacle is positioned within the guide channel 138, 158, with one or more optical fibers 198 extending from that distal end onto the tray (see FIG. 5). In other examples (see FIGS. 3, 6) the sheaths 50, 52 can extend farther into, or even into and beyond, the guide channels 138, 150.

Similar to the receptacle 114, the receptacle 116 includes a bottom wall 140 and two opposing side walls 142 and 144 extending upwards from the bottom wall 140. The bottom wall 140 includes an elongate slot 146 extending distally from a proximal open end 148 to a distal closed end 150. In this example, the proximal open end 148 is trumpet shaped, narrowing in the proximal to distal direction. Each of the side walls 142, 144 includes a ramp 152, 154. The ramps 152, 154 incline towards each other and towards the axis A2 as they extend distally, defining a neck region 155 of a holder receiving volume 156, the holder receiving volume 156 being itself defined by the side walls 142 and 144 and the bottom wall 140 of the receptacle 116. Distally from the ramps 152, 154 the bottom wall 140 and side walls 142, 144 define a guide channel 158, the guide channel 158 being adapted to receive and guide a distal end portion of a fiber optic sheath, such as a tube containing one or more fibers, a distal end portion of a cable jacket containing one or more fibers, a portion of one or more coated and cladded or cladded optical fibers extending from a distal end of a tube or cable jacket, etc. The guide channel 158 opens onto the first region 106.

Each of the side walls 122, 124, 142, 144 includes one or more ribs 160. The ribs 160 are arranged in pairs on opposing corresponding side walls, each pair of ribs 160 corresponding to a different axial position relative to the corresponding axis A1, A2. In the example shown, each receptacle 114, 116 includes two pairs of ribs 160, however more or fewer pairs may also be suitable. The ribs 160 are configured to engage and thereby couple to grooves of a holder, as described in greater detail below. Thus, each pair of opposing grooves corresponds to a selectable coupling position of a holder and that corresponding receptacle.

Referring now to FIGS. 3, 5-8, and 13-17, the assembly 112 also includes, for each receptacle 114, 116, a holder 162 adapted to securely couple to the corresponding receptacle 114, 116 at any of a number of selectable (i.e., adjustable) positions along the corresponding axis A1, A2. In some examples, the holder 162 is made from a polymeric material. The holder 162 extends from a proximal end 164 to a distal end 166. The holder 162 includes a main body 168 that defines a seat 170 for seating a portion of a fiber optic sheath, such as a protective tube, a cable jacket, a coated and/or cladded optical fiber, etc. In some examples, the main body 168 is configured such that the seat 170 can accommodate fiber optic sheaths having a transverse diameter (perpendicular to the axis A1, A2 when the holder and a receptacle are coupled) in a range from about 900 microns to about 5 millimeters, or in a range from about 1.5 millimeters to about 8 millimeters, or in a range from about 1.5 millimeters to about 3 millimeters, with transverse diameters outside of these ranges also being able to be accommodated in some examples.

Extending distally from the main body 168 are a pair of flexibly resilient gripper arms 172 and 174 that end at free distal ends 176, 178, respectively. An elongate track 180 extends downwards from the main body 168. In this example, the track 180 has a substantially T-shaped cross-section perpendicular to the direction of elongation. Outer walls 182, 184 of the main body 168 define spaced apart grooves 186. At or near the distal ends 176, 178 of the gripper arms 172, 174, frictional projections 188 project towards each other (and towards the corresponding axis A1, A2, when the holder and corresponding receptacle 114, 116 are coupled together). The frictional projections 188 include one or more tooth members or teeth 190 that define alternating vertically elongated recesses 192 between adjacent pairs of the teeth 190.

To couple a holder 162 to a receptacle 114, 116 the holder 162 is aligned with the receptacle 114, 116, such that distal advancement of the holder 162 causes the track 180 to enter and slidably engage with the slot 126, 146. How far the holder 162 is distally advanced into the holder receiving volume 156 depends on the transverse diameter of the sheath 50, 52 seated on the seat 170, with the goal being that the gripper arms 172, 174 should grip the sheath 50, 52. For relatively narrow sheaths, for example, such as the sheath 52, the holder 162 is distally advanced sufficiently that the gripper arms 172, 174 engage the ramps 152, 154, causing the gripper arms 172, 174 to flex towards each other and grip the sheath 52 with the frictional projections 188. Comparing FIGS. 6 and 8, for example, the holder 162 seating the sheath 52 has been more distally advanced in the receptacle 116 in FIG. 8 than in FIG. 6, such that in FIG. 8 the frictional projections 188 grip the sheath 52. In contrast, the sheath 50 is sufficiently wide such that the gripper arms 172, 174 grip the sheath 50 without the gripper arms 172, 174 engaging and flexing inward from engagement with the ramps 132 and 134. Thus, it should be appreciated that the gap 194 between the frictional projections 188 on the opposing gripper arms 172, 174 can be adjusted by adjusting the axial position of the holder 162 relative to the receptacle 114, 116. Appropriately positioned grooves 186 of the holder 162 engage the ribs 160 of the receptacle when the holder is at the desired axial position relative to the receptacle, the coupling of grooves 186 and ribs 160 effectively axially locking the holder in the desired axial position, while the engagement of the track 180 to the slot 126, 146 effectively locks the holder vertically relative to the receptacle. In some examples the gripper arms and frictional projections are configured, by engagement with the ramps, to narrow the gap 194 sufficiently to grip sheaths as transversely narrow as 900 microns or less (e.g., 800 microns, 700 microns, 600 microns, 500 microns, 400, microns, 300 microns, 200 microns).

To axially adjust the holder 162 from one ribs-grooves engagement position to another ribs-grooves engagement position (e.g., in order to cause the gripper arms to engage the ramps), the walls 122, 124 or 142, 144 of the corresponding receptacle can be resiliently flexed away from each other and the corresponding axis A1, A2 in order to sufficiently disengage the ribs 160 from the grooves 186 to allow relative axial movement between the holder 162 and the receptacle 114, 116.

Optionally, the holder 162 has an open top 196 to facilitate loading of a sheath onto the seat 170. Optionally, the transvers cross-sectional shape of the seat 170 is shaped to correspond to the transverse shape of a sheath to be loaded thereon. In the example shown, the transverse cross-sectional shape of the seat 170 is substantially rounded, e.g., to accommodate transversely round sheaths. To accommodate a flat or oblong sheath, a holder can have a differently shaped seat.

In addition to the embodiment of the holder 162, the receptacle 114, 116 is configured to cooperate in similar manner with further embodiments of a holder, including but not limited to the holders, 300, 400, and 500 described below.

Figure 10:
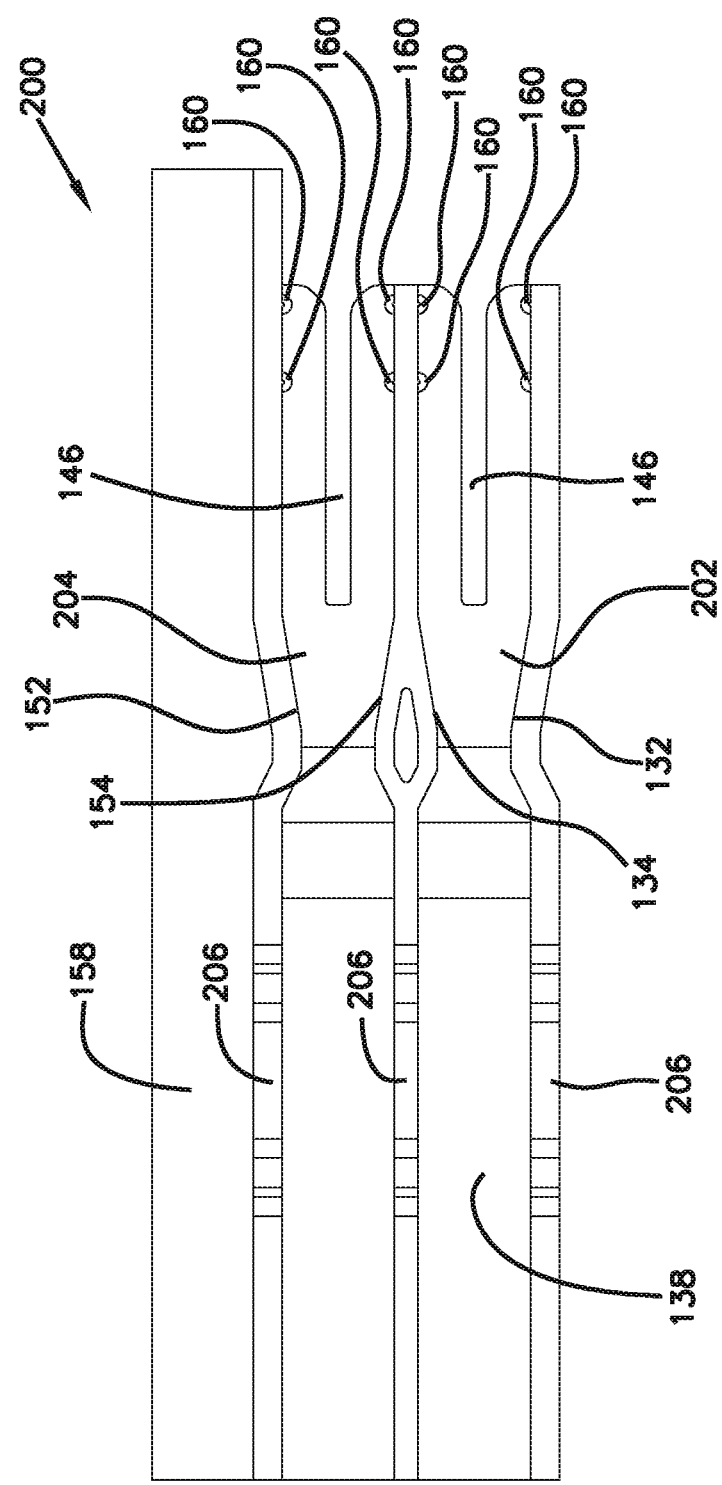
FIG. 10 is a top view of a receptacle portion of a further embodiment of an anchoring assembly in accordance with the present disclosure.
Figure 11:
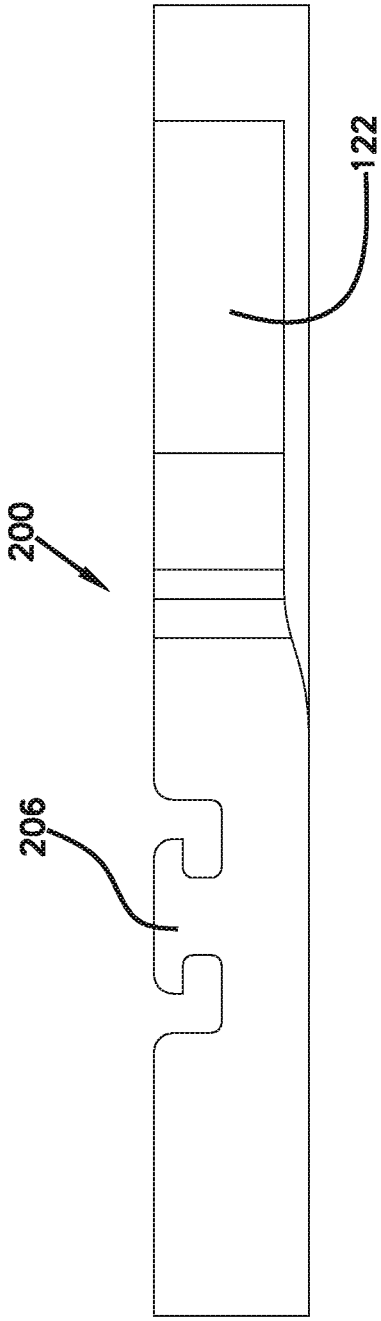
FIG. 11 is a side view of the receptacle portion of FIG. 9.
Figure 12:
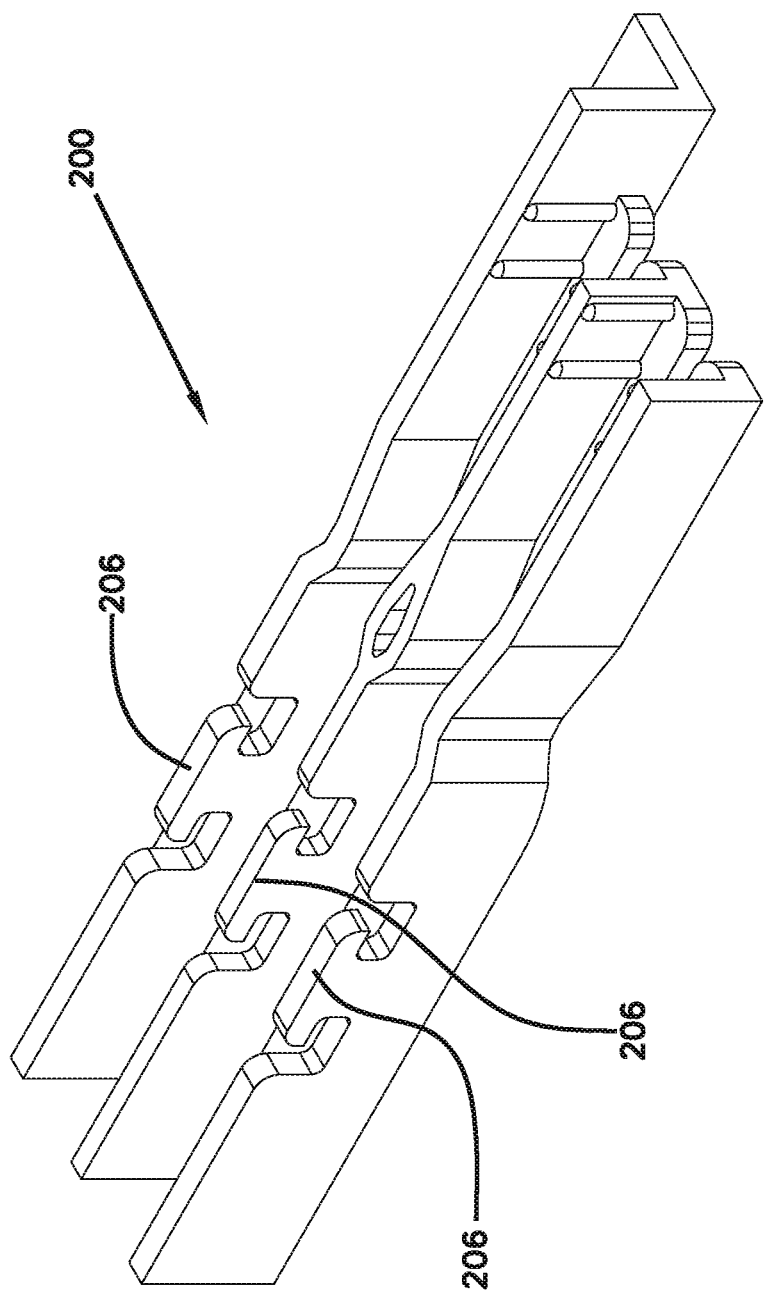
FIG. 12 is a perspective view of the receptacle portion of FIG. 9.

Referring now to FIGS. 10-12, a further embodiment of a receptacle arrangement 200 including a pair of receptacles 202, 204 is shown. The receptacles 202, 204 include many of the features of the holder receptacles 114, 116 described above. In addition, distally from the ramps 132, 134, 152, 154, the walls define anchors 206. Strength member fiber, such as aramid yarn, extending from the distal end of a sheath (e.g., a jacket cable) can be wrapped around and/or tied to one or more of the anchors 206 to thereby improve the fixation of a cable and protect the cable's optical fiber(s) from external loads. The receptacle 202, 204 is configured to couplingly cooperate with different embodiments of holders in similar manner to that described above, including but not limited to the holder 162 described above, and the holders 300, 400, and 500 described below.

Figure 19:
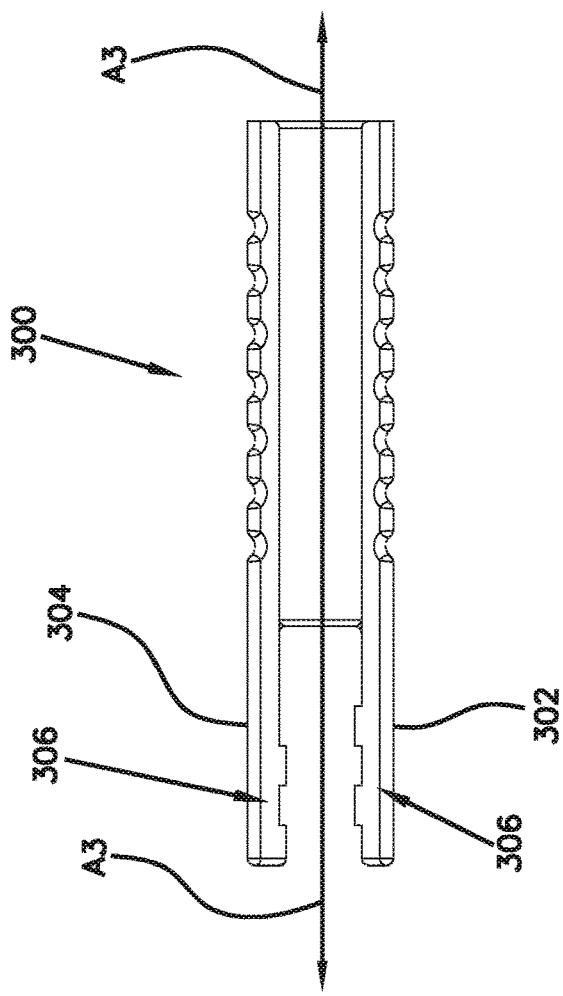
FIG. 19 is a top view of the holder of FIG. 18.
Figure 18:
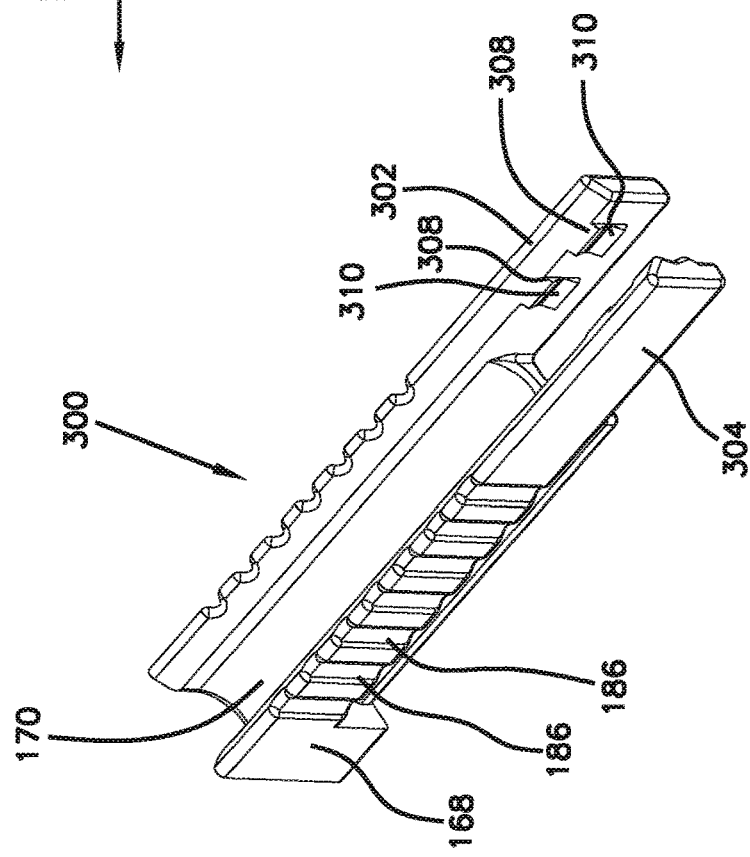
FIG. 18 is a perspective view of a further embodiment of a holder of an anchoring assembly in accordance with the present disclosure.

Referring now to FIGS. 18-19, a further embodiment of a holder 300 adapted to adjustably couple and cooperate with a receptacle (such as the receptacle 114, 116, or the receptacle 202, 204 as described above) is shown. The holder 200 includes a pair of opposing gripper arms 302, 304 extending distally from the main body 168. Frictional projections 306 project towards each other and towards the axis A3. The projections 306 of the gripper arm 302 are axially offset or axially staggered relative to the projections 306 of the gripper arm 304. The projection includes two spaced apart tooth members 308 that define a V-shaped groove 310 extending parallel to the axis A3. The grooves 310 are positioned to hug the outer surface of a sheath to thereby grip the sheath when the holder 300 and a receptacle are coupled at the appropriate coupling position for the size of the sheath. The configuration of the grooves 310 (elongate in the axial direction) and the staggering of the tooth members can provide for less pressure being applied on the sheath by a tooth member at a given point of contact between tooth member and sheath, which can help to reduce the chances of damaging the sheath by the gripping force.

Figure 22:
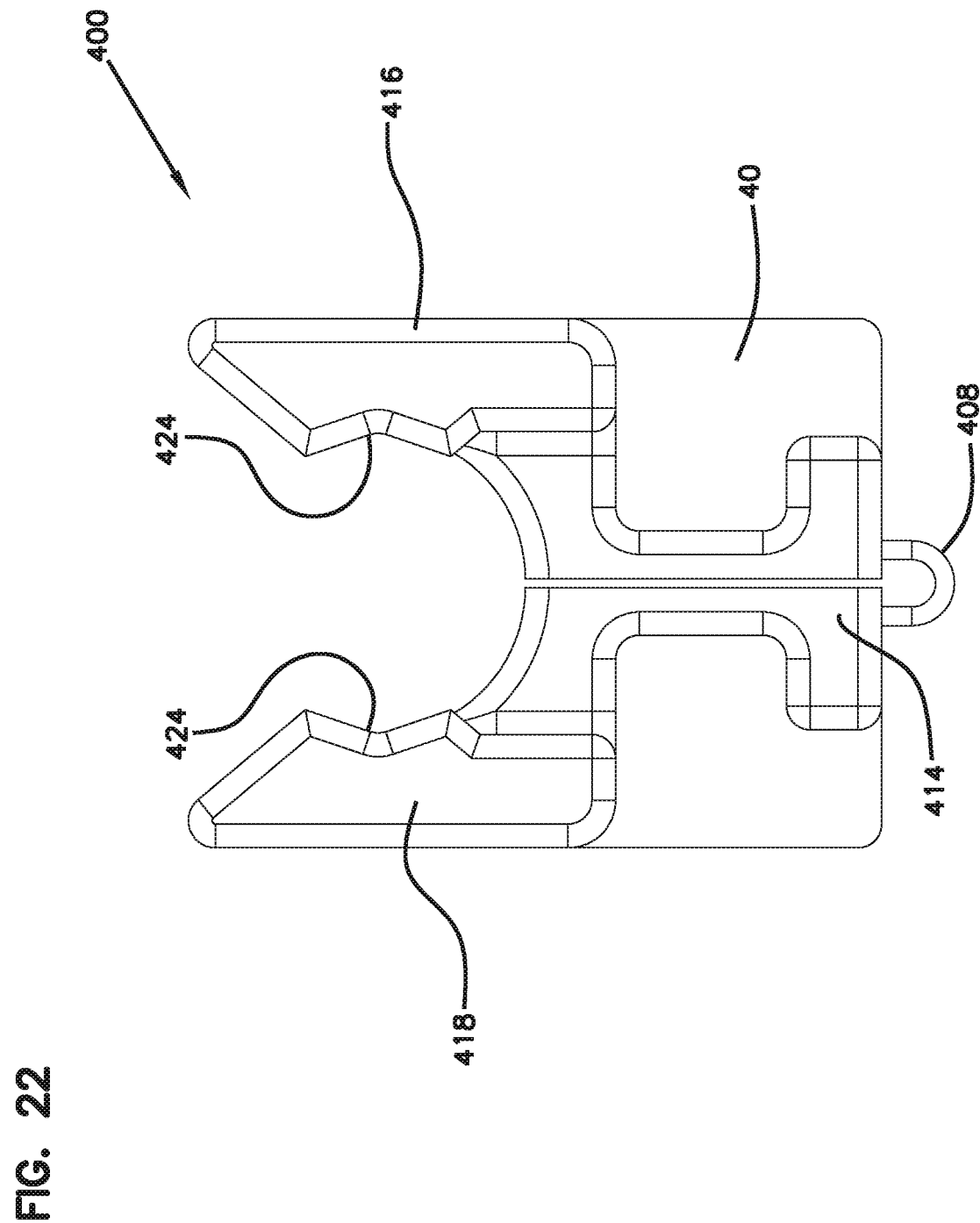
FIG. 22 is a distal end view of the holder of FIG. 20, the holder being in the loaded or first holding configuration.
Figure 26:
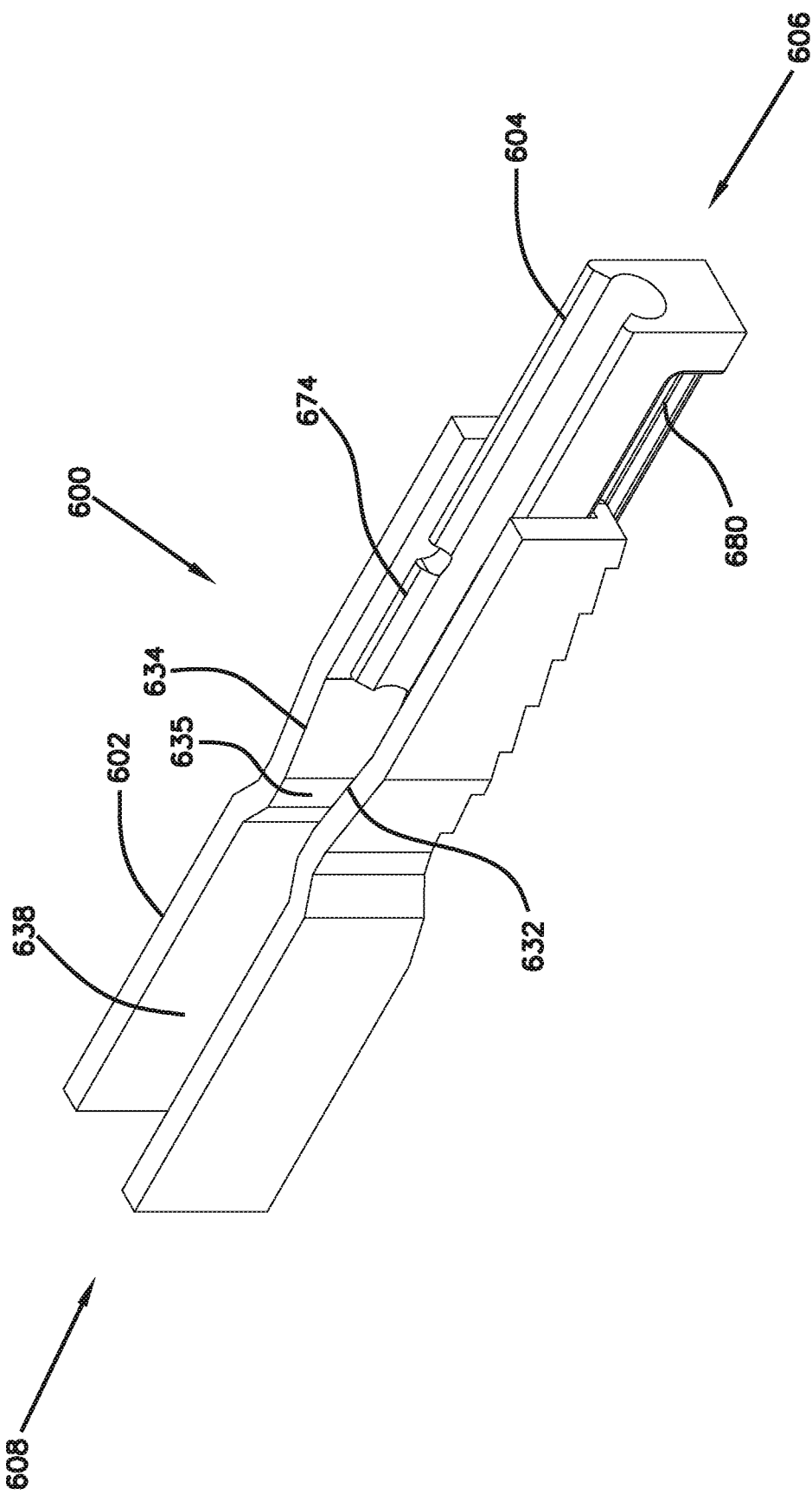
FIG. 26 is a perspective view of a further anchoring assembly in accordance with the present disclosure, the assembly being in a coupled configuration.
Figure 27:
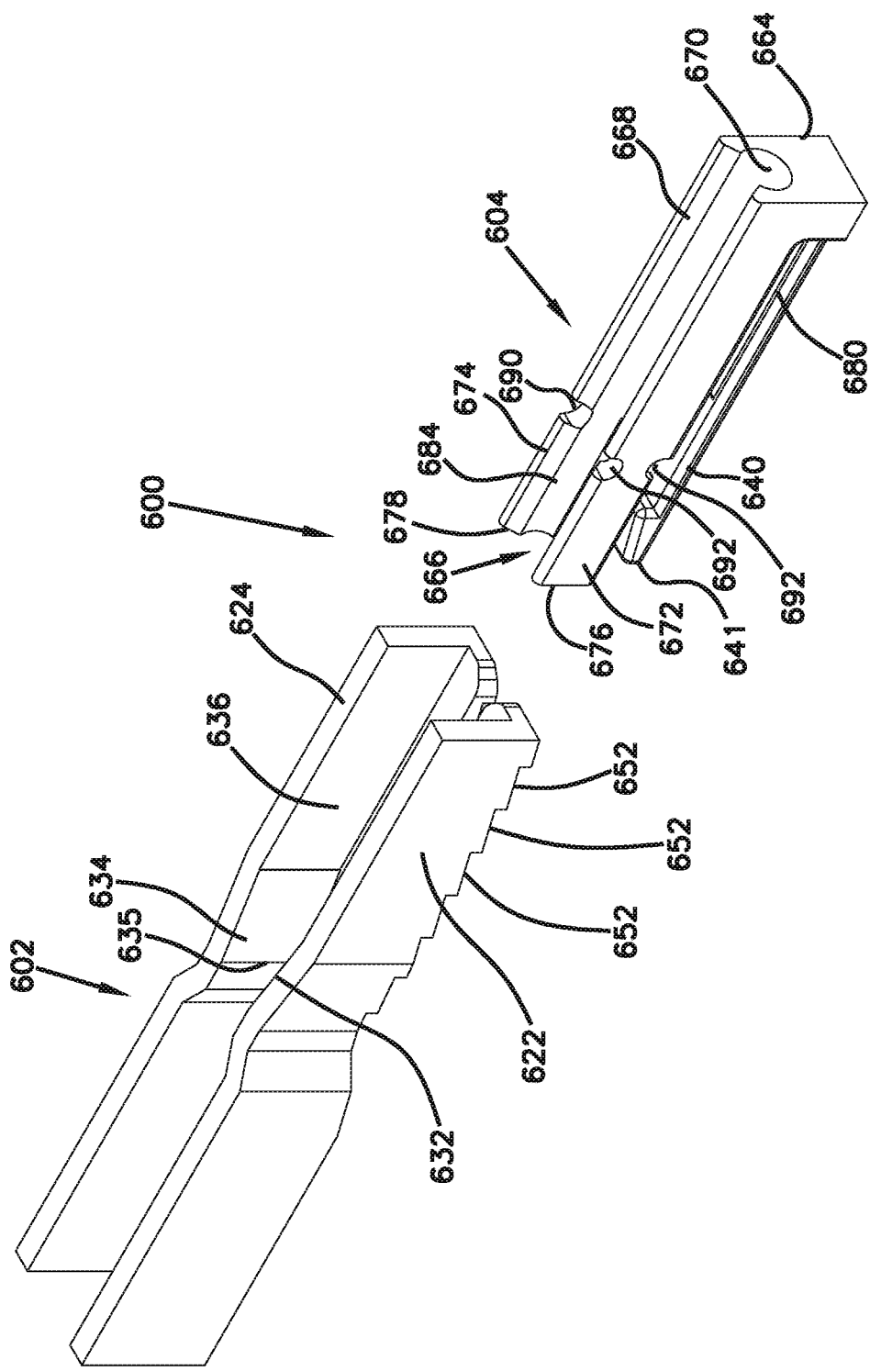
FIG. 27 is a further perspective view of the assembly of FIG. 26, the assembly being in an uncoupled configuration.
Figure 30:
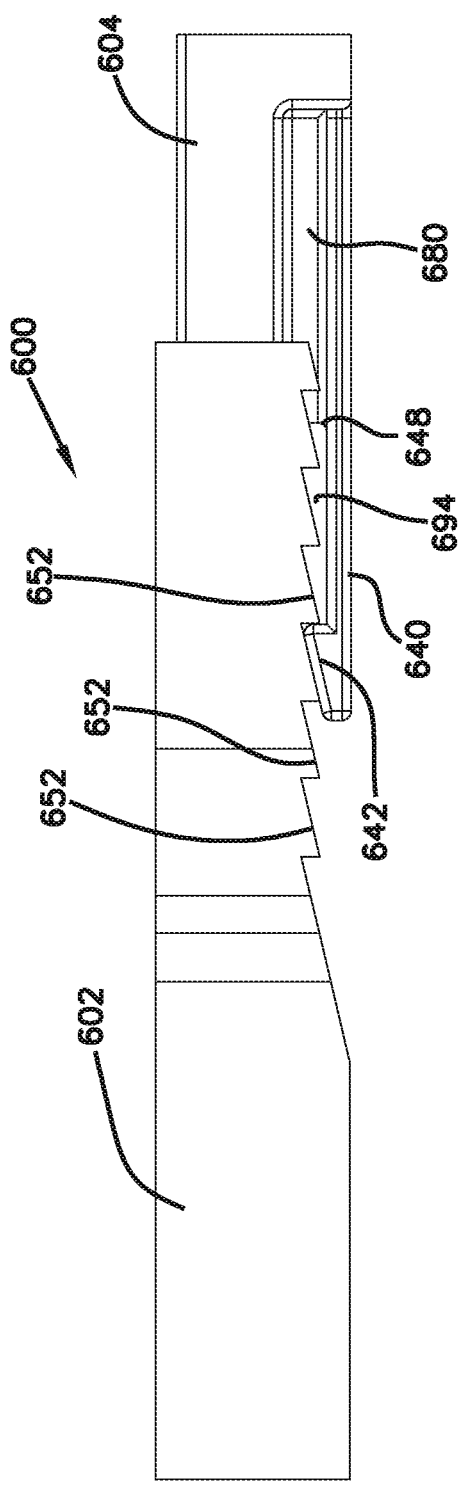
FIG. 30 is a side view of the assembly of FIG. 26.
Figure 32:
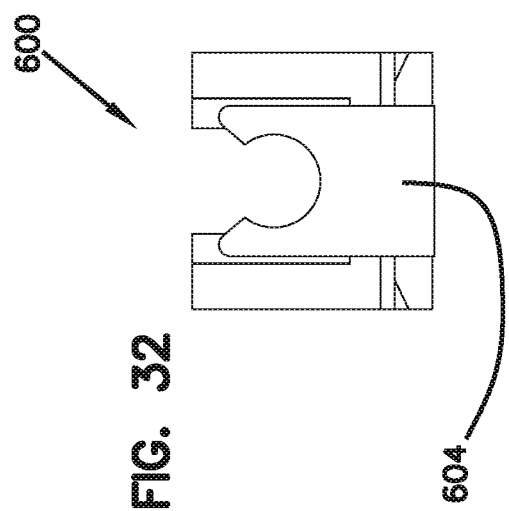
FIG. 32 is a proximal end view of the assembly of FIG. 26.
Figure 31:
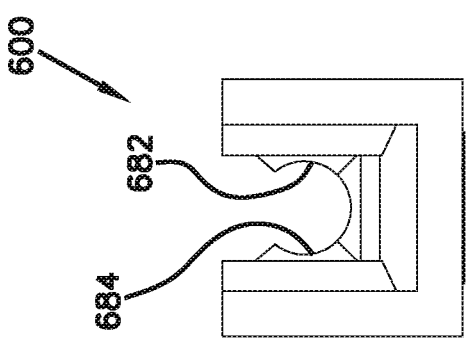
FIG. 31 is a distal end view of the assembly of FIG. 26.
Figure 33:
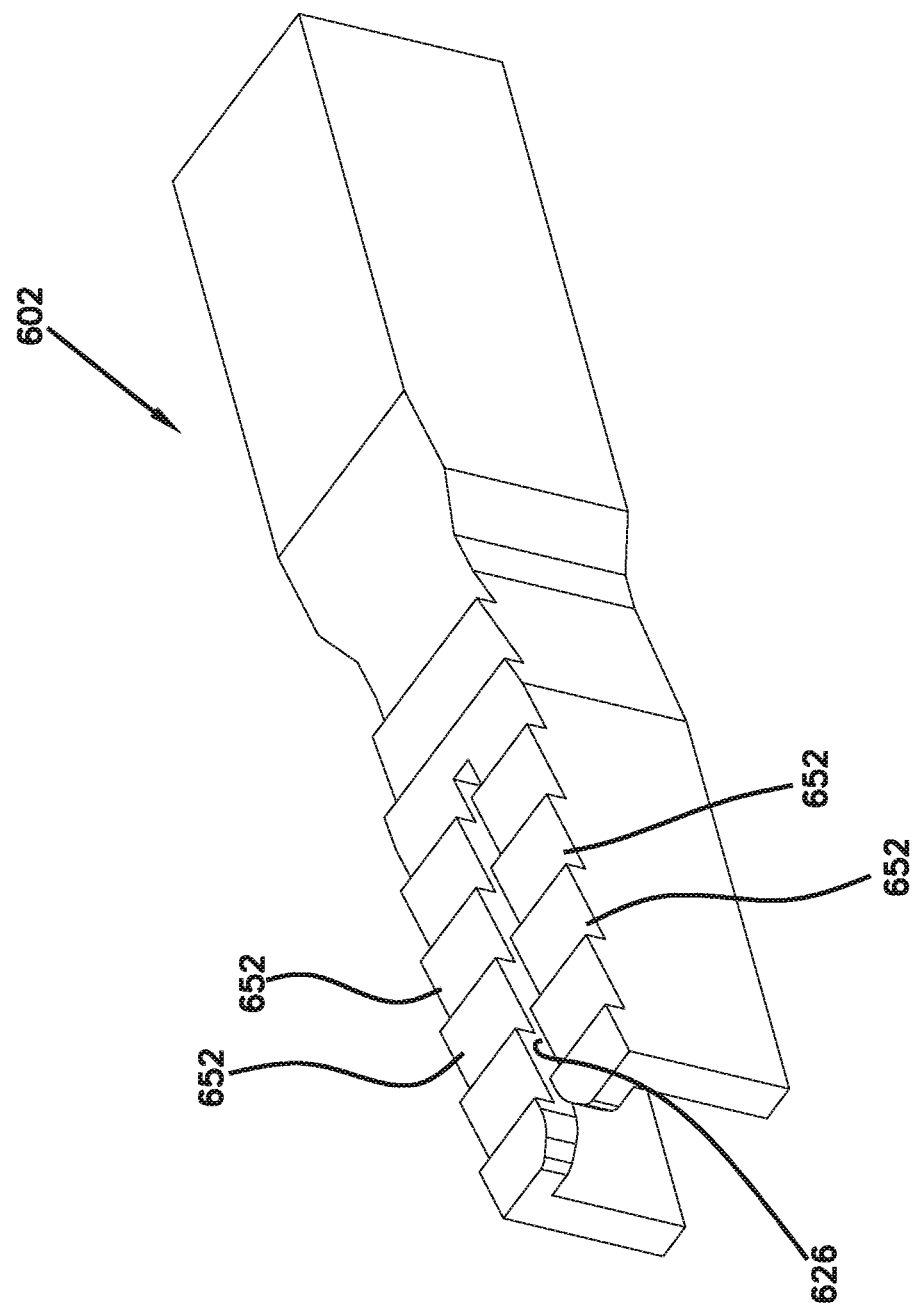
FIG. 33 is a perspective view of the receptacle portion of the assembly of FIG. 26.
Figure 34:
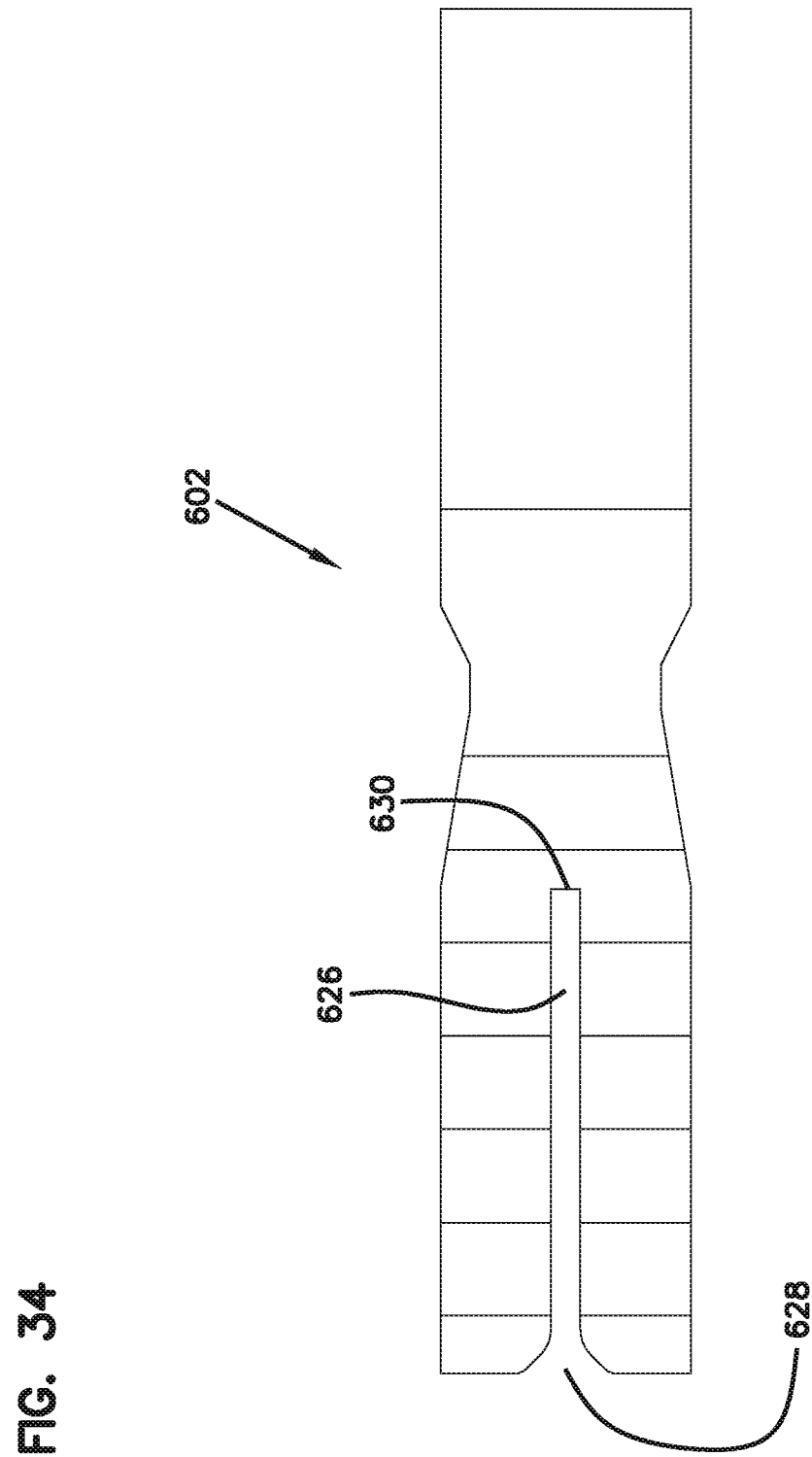
FIG. 34 is a bottom view of the receptacle portion of FIG. 33.

Referring now to FIGS. 20-22, a further embodiment of a holder 400 adapted to adjustably couple and cooperate with a receptacle (such as the receptacle 114, 116, or the receptacle 202, 204 as described above) is shown. The main body 402 of the holder 400 includes a pair of body members 404, 406 that are pivotally coupled to each other by a hinge 408, e.g., a living hinge that is integrally formed with the body members 404, 406. The hinge 408 permits adjustment of the holder 400 between a loading configuration (FIG. 20) and a holding configuration (FIG. 21). A sheath (e.g., the sheath 50) can be loaded into the holder 400 with the holder in the loading configuration, and then the body member 404 is pivoted (in the direction of the arrow 410) about the hinge 408 into the holding configuration such that the sheath is seated on the seat 412 formed by the body members 404 and 406. Optionally, a lock or fastener can be provided to releasably lock the body members 404 and 406 in the holding configuration. Alternatively, the hinge 408 can be loaded with a biasing force that biases the body members towards the holding configuration. Alternatively, the engagement of the holder 400 with a receptacle (e.g., the receptacle 114, 116, 202, 204) causes the body members 404 and 406 to retain the holding configuration. A track 414 engageable with a receptacle slot as described above projects downwards from the main body 402. A pair of opposing gripper arms 416, 418 extend distally from the main body 402. Frictional projections 420 project towards each other and towards the axis A4. Each projection 420 includes a tooth member 422 that defines a V-shaped groove 424, the grooves 424 being aligned with each other and extending parallel to the axis A4. The grooves 424 are positioned to hug the outer surface of a sheath to thereby grip the sheath when the holder 400 and a receptacle are coupled at the appropriate coupling position for the size of the sheath. Referring to FIG. 23, the gripper arms 416 and 418 are shown in a flexed configuration, the arms being resiliently flexed towards each other and towards the axis A4. Such flexing can be generated by the gripper arms' engagement with ramps of a receptacle, as described above, in order for the gripper arms to grip a relatively narrow sheath.

Referring now to FIGS. 24-25, a further embodiment of a holder 500 adapted to adjustably couple and cooperate with a receptacle (such as the receptacle 114, 116, or the receptacle 202, 204 as described above) is shown. The holder 500 includes similar features to the holder 400. In addition, the holder 500 includes gripper arms 502, 504 distally extending from the main body 402. The gripper arms 502, 504, are each fitted with a frictional member in the form of a gripper pad 506 extending proximally from the distal ends of the gripper arms 502, 504, the pads 506 being aligned with each other. The gripper pads 506 can be made of a softer material than, e.g., the rest of the holder 500. For example, the gripper pads 506 can be made of a material having a durometer in a range from about 20 to about 80 on the Shore 00 scale. In some examples, the gripper pads 506 are made from silicone or another elastomeric material. The soft and resilient characteristics of the gripper pads 506 are suitable for gripping a sheath held by the holder 500 in the holding configuration and the holder 500 is coupled to a receptacle.

Referring now to FIGS. 26-34, a further embodiment of an adjustable fixation assembly 600, including a receptacle 602 and a holder 604 will be described. The assembly 600 is defined by an axis A5. The receptacle 602 and holder 604 cooperate to hold a sheath. In addition, the holder 604 includes features for anchoring a strength member, such as aramid yarn. The assembly 600, as a single assembly or gang of multiple assemblies 600, can be positioned, or integrated with, any suitable telecommunications management equipment, such as termination panel, a splice tray, a closure, a rack, a cabinet, a wall outlet or box at a customer premises, etc. The assembly extends from a proximal end 606 to a distal end 608.

The receptacle 602 includes a bottom wall 620 and two opposing side walls 622 and 624 extending upwards from the bottom wall 620. The bottom wall 620 includes an elongate slot 626 extending distally from a proximal open end 628 to a distal closed end 630. In this example, the proximal open end 628 is trumpet shaped, narrowing in the proximal to distal direction, which can facilitate insertion of the holder track 680 into the slot 626. Each of the side walls 622, 624 includes a ramp 632, 634. The ramps 632, 634 incline towards each other and towards the axis A5 as they extend distally, defining a neck region 635 of a holder receiving volume 636 of the receptacle 602, the holder receiving volume 636 being defined by the side walls 622 and 624 and bottom wall 620. Distally from the ramps 632, 634 and the neck region 635, the bottom wall 620 and side walls 622, 624 define a guide channel 638, the guide channel 638 being adapted to receive and guide a distal portion of a tube, a distal portion of a cable jacket, a portion of one or more protected optical fibers extending from a distal end of a tube or cable jacket, etc. The distal end of the guide channel 638 opens to a fiber management region or device of a telecommunications management equipment. In some examples, the distal end of the sheath held by a holder and receptacle is positioned within the guide channel 638 (i.e., distally of the neck region 635) with one or more optical fibers extending distally from that distal end. In other examples the sheath can extend distally beyond the guide channel 638. In still other examples, the sheath is terminated in (i.e., the distal end of the sheath is positioned in) the neck region 635.

The holder 604 is adapted to securely couple to the receptacle 602 at any of a number of selectable (i.e., adjustable) positions along the axis A5. In some examples, the holder 604 is made from a polymeric material. The holder 604 extends from a proximal end 664 to a distal end 666. The holder 604 includes a main body 668 that defines a seat 670 for seating a portion of a fiber optic sheath, such as a protective tube, a cable jacket, a coated and/or cladded optical fiber, etc. In some examples, the main body 668 is configured such that the seat 670 can accommodate fiber optic sheaths having a transverse diameter (perpendicular to the axis A5 when the holder 604 and the receptacle 602 are coupled) in a range from about 900 microns to about 5 millimeters, or in a range from about 1.5 millimeters to about 8 millimeters, with transverse diameters outside of these ranges also being able to be accommodated in some examples.

Extending distally from the main body 660 are a pair of flexibly resilient gripper arms 672 and 674 that end at free distal ends 676, 678, respectively. An elongate track 680 extends downwards from the main body 660. In this example, the track 680 has a substantially T-shaped cross-section perpendicular to the direction of elongation. Optionally, at or near the distal ends 676, 678 of the gripper arms 672, 674, frictional projections (not shown) can be provided to project towards each other (and towards the corresponding axis A1, A2, when the holder and corresponding receptacle are coupled together. Examples of such frictional projections are described above. Alternatively, as shown, the gripper arms 672, 674 include concave surfaces 682, 684 that face each other, the concavity being adapted to complement and hug an exterior surface of a sheath. Each of the gripper arms 672, 674 (or alternatively the main body 660) defines a pair of vertically spaced notches 690, 692. In each pair of notches the notches face away from each other. The notches 690, 692 are adapted to receive a strength member as described in greater detail below.

Extending distally from the track 680 is a cantilever member 640 extending to a distal end 641. The bottom surface 650 of the receptacle 602 defines a plurality of ratchet teeth 652, each of the ratchet teeth 652 corresponding to a selectable axial position of the holder 604 relative to the receptacle 602. The cantilever member 640 includes a pawl 642 at or towards the distal end 641. The pawl 642 is geometrically complementary to, and configured to cooperate with, the ratchet teeth 652, in order to lock the holder to the receptacle at a desired position depending on the amount of engagement between gripper arms and ramps required for a given sheath desired to be held by the holder. The shape of the ratchet teeth 652 permits the holder 604 to be distally advanced in the receptacle 602 relatively easily, until the gripper arms 672, 674 grip the sheath, while hindering proximal movement of the holder relative to the receptacle unless the cantilever member 640 is flexed downward about its pivot point 648 such that the pawl 642 disengages the ratchet teeth 652.

A void 694 is defined between the cantilever member 640 and the gripper arms 672, 674.

To couple the holder 604 to the receptacle 602 the holder 604 is aligned with the receptacle 602, such that distal advancement of the holder 604 causes the track 680 to enter and slidably engage with the slot 626. How far the holder 604 is distally advanced into the holder receiving volume 656 depends on the transverse diameter of the sheath seated on the seat 670, with the goal being that the gripper arms 672, 674 should grip the sheath. As the holder is distally advanced, the cantilever member 640 resilient flexes to allow the pawl 642 to engage a desired ratchet tooth 652. For relatively narrow sheaths, for example, such as the sheath, the holder 604 is distally advanced sufficiently that the gripper arms 672, 674 engage the ramps 632, 634, causing the gripper arms 672, 674 to flex towards each other and grip the sheath. An appropriately positioned ratchet tooth 652 engages the pawl 642 when the holder is at the desired axial position relative to the receptacle, the pawl-to-ratchet tooth coupling effectively axially locking the holder in the desired axial position, while the engagement of the track 680 to the slot 626 effectively locks the holder vertically relative to the receptacle. In some examples the gripper arms are configured, by engagement with the ramps, to narrow the gap between the gripper arms sufficiently to grip sheaths as transversely narrow as 900 microns or less (e.g., 800 microns, 700, microns, 600 microns, 500 microns, 400, microns, 300 microns, 200 microns).

Figure 35:
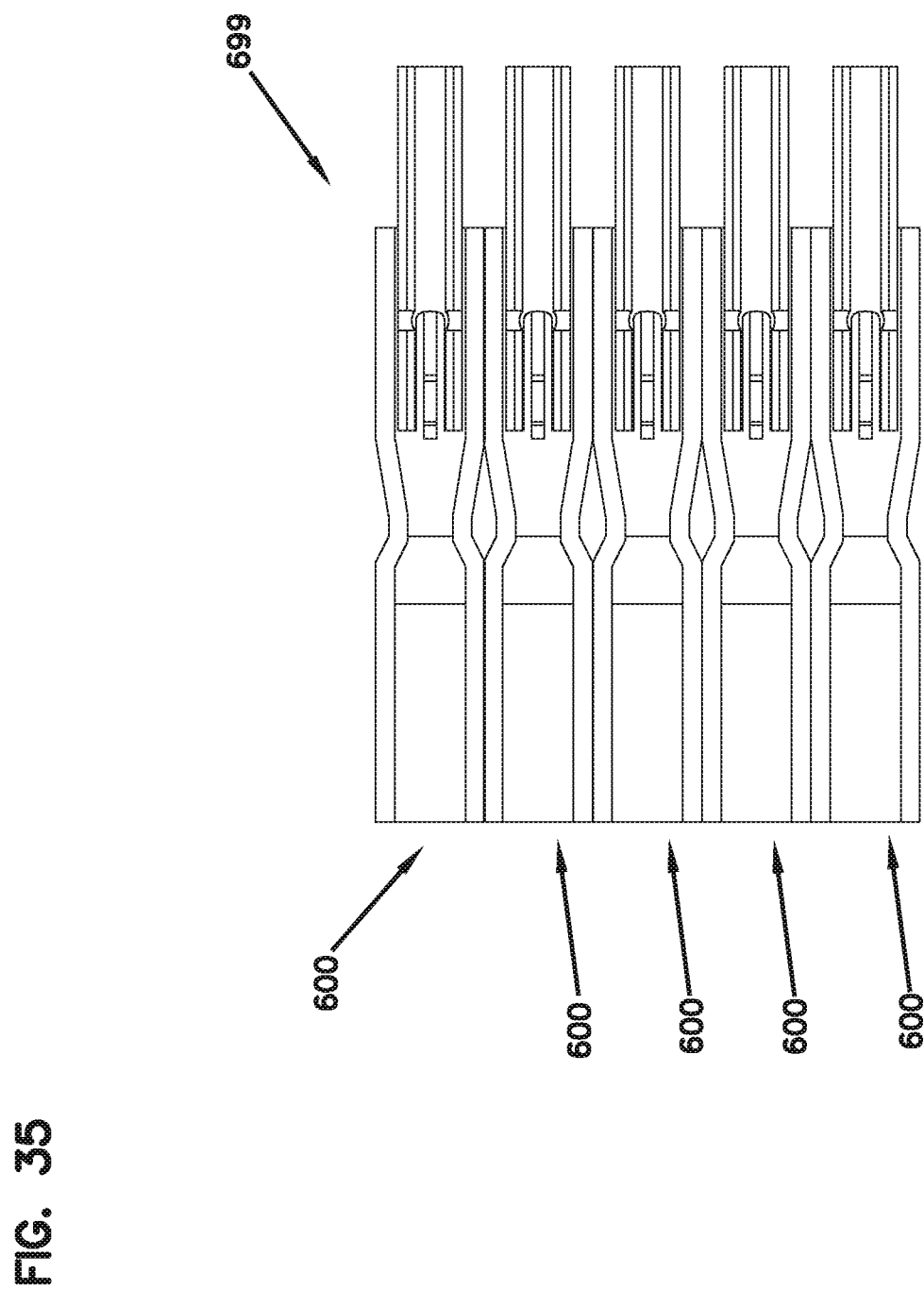
FIG. 35 is a top view of an arrangement of a plurality of the assemblies of FIG. 26.

Referring to FIG. 35, a group 699 of a plurality (in this case five) of the assemblies 600 are ganged together. Optionally, the gang of receptacles is formed as an integral unit and can be incorporated into any suitable telecommunications management equipment. The coupling and adjustment mechanism of the pawl and ratchet teeth allows the adjustment of one holder relative to its receptacle in the group 699 without moving or impacting the other receptacles in the group.

Figure 36:
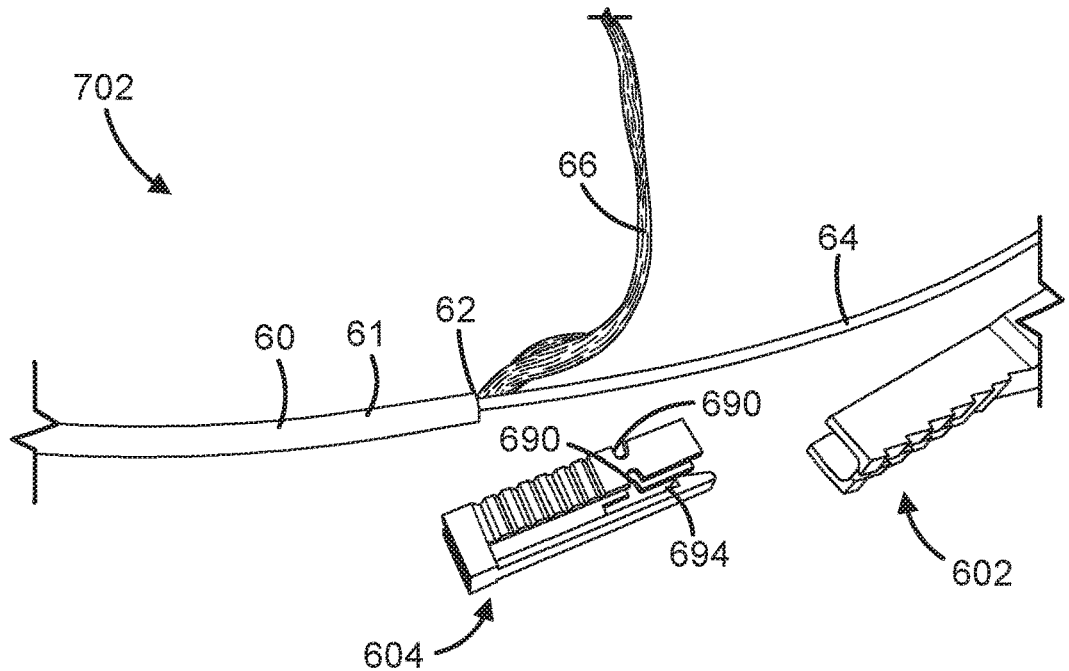
FIG. 36 illustrates a step of a method of anchoring a telecommunications cable strength member.

Referring now to FIGS. 36-42, a method of anchoring a strength member 66 (in this case, aramid yarn) and an inner sheath of a telecommunications cable 60 to the assembly 600 just described is illustrated and will be described. Referring to FIG. 36, a method step 702 is pictorially represented. A cable 60 includes an outer jacket or outer sheath 61 that has been stripped such that it has a distal end 62. The strength member 66 has a portion (i.e., an exposed portion) that extends beyond the distal end 62. An inner sheath 64, holding one or more optical fibers also extends distally from the distal end 62 of the outer jacket 61.

Figure 37:
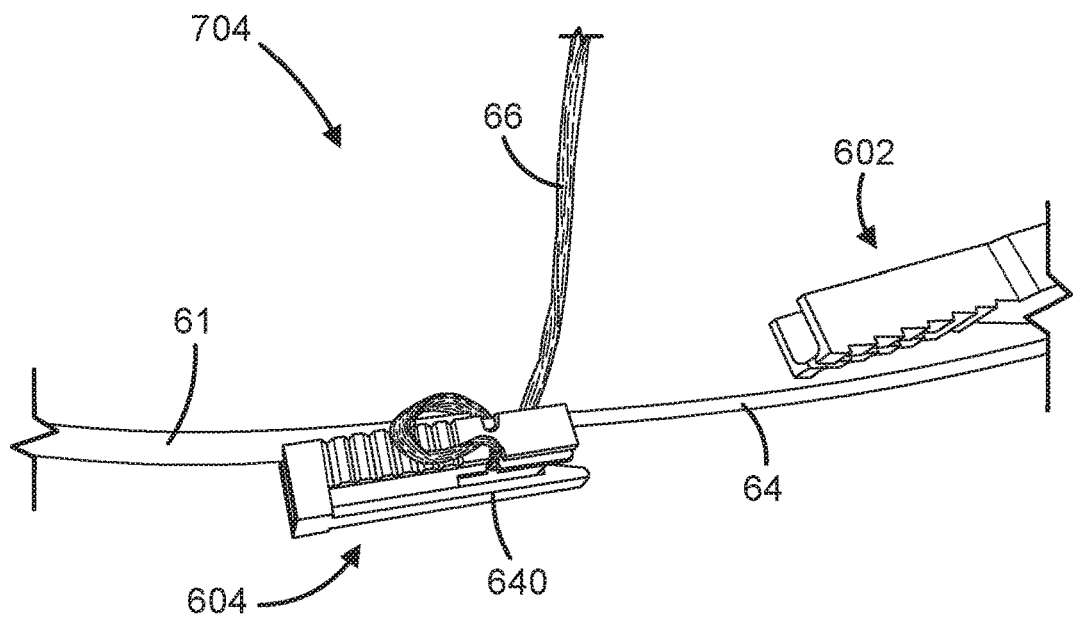
FIG. 37 depicts a further step of a method of anchoring a telecommunications cable strength member.
Figure 38:
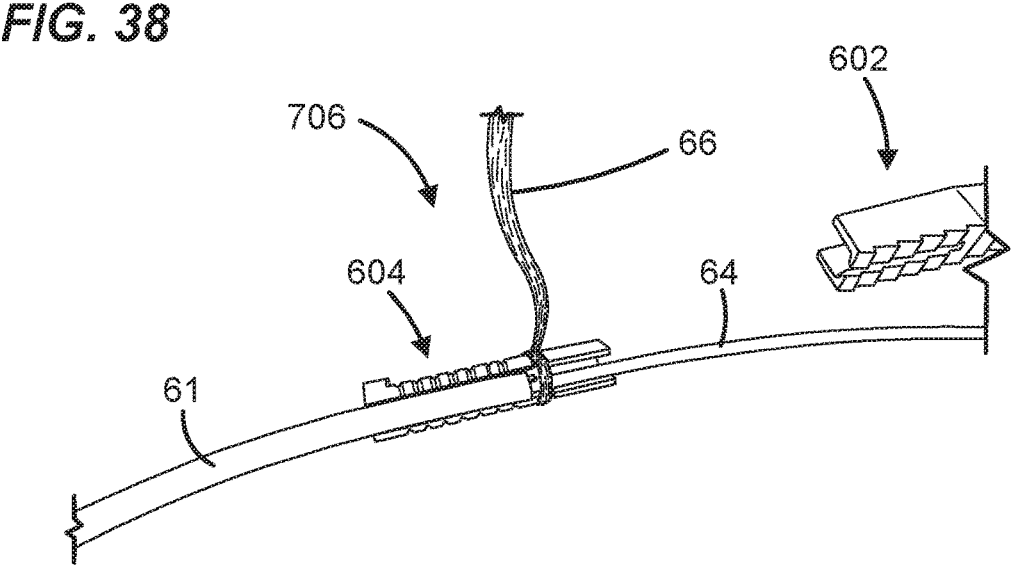
FIG. 38 depicts a further step of a method of anchoring a telecommunications cable strength member.
Figure 39:
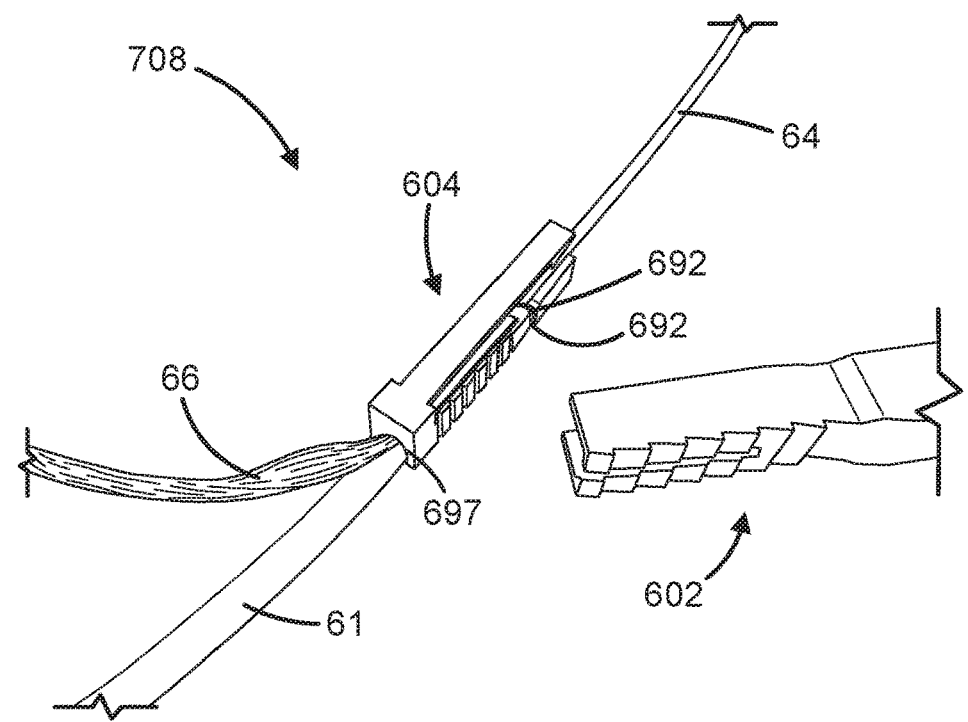
FIG. 39 depicts a further step of a method of anchoring a telecommunications cable strength member.
Figure 40:
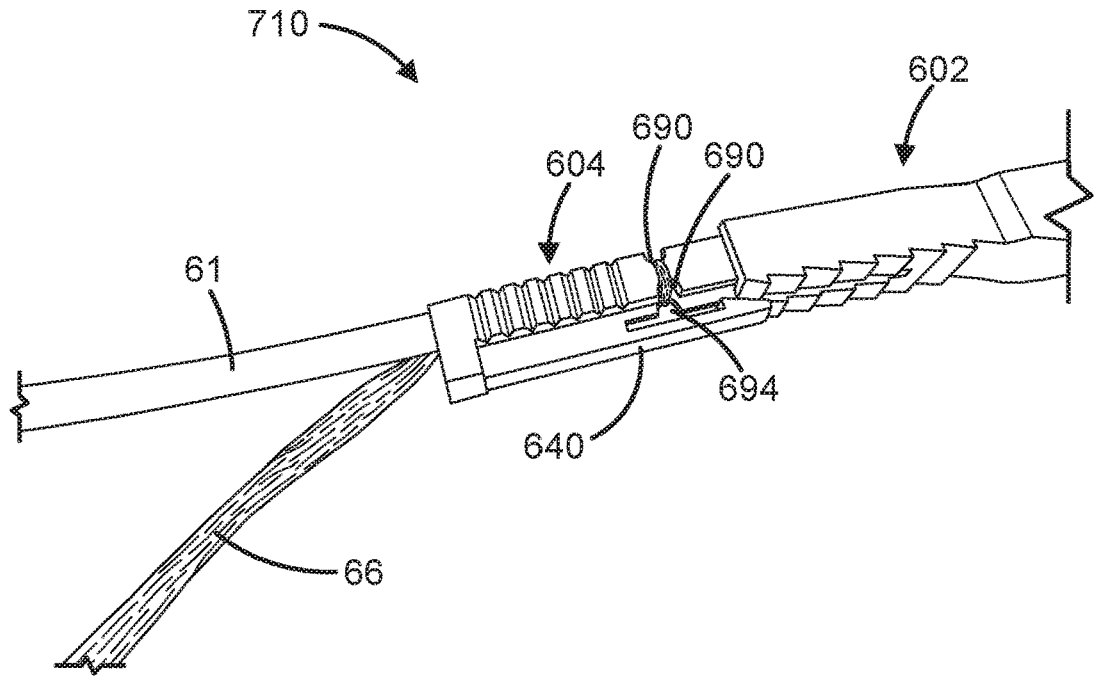
FIG. 40 depicts a further step of a method of anchoring a telecommunications cable strength member.
Figure 41:
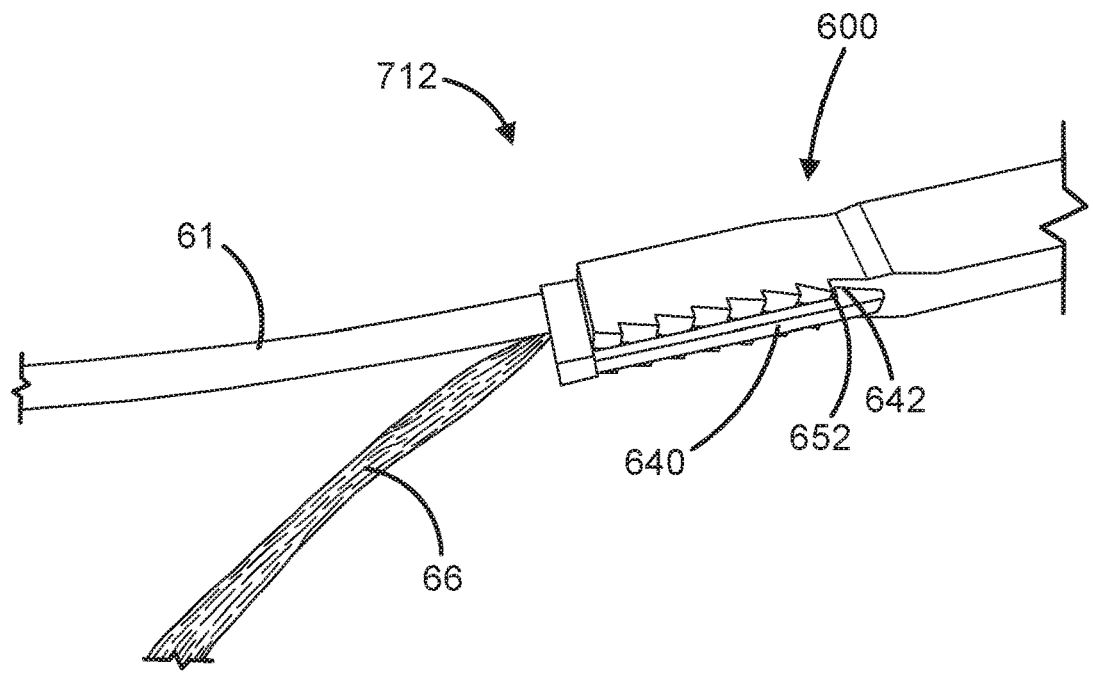
FIG. 41 depicts a further step of a method of anchoring a telecommunications cable strength member.
Figure 42:
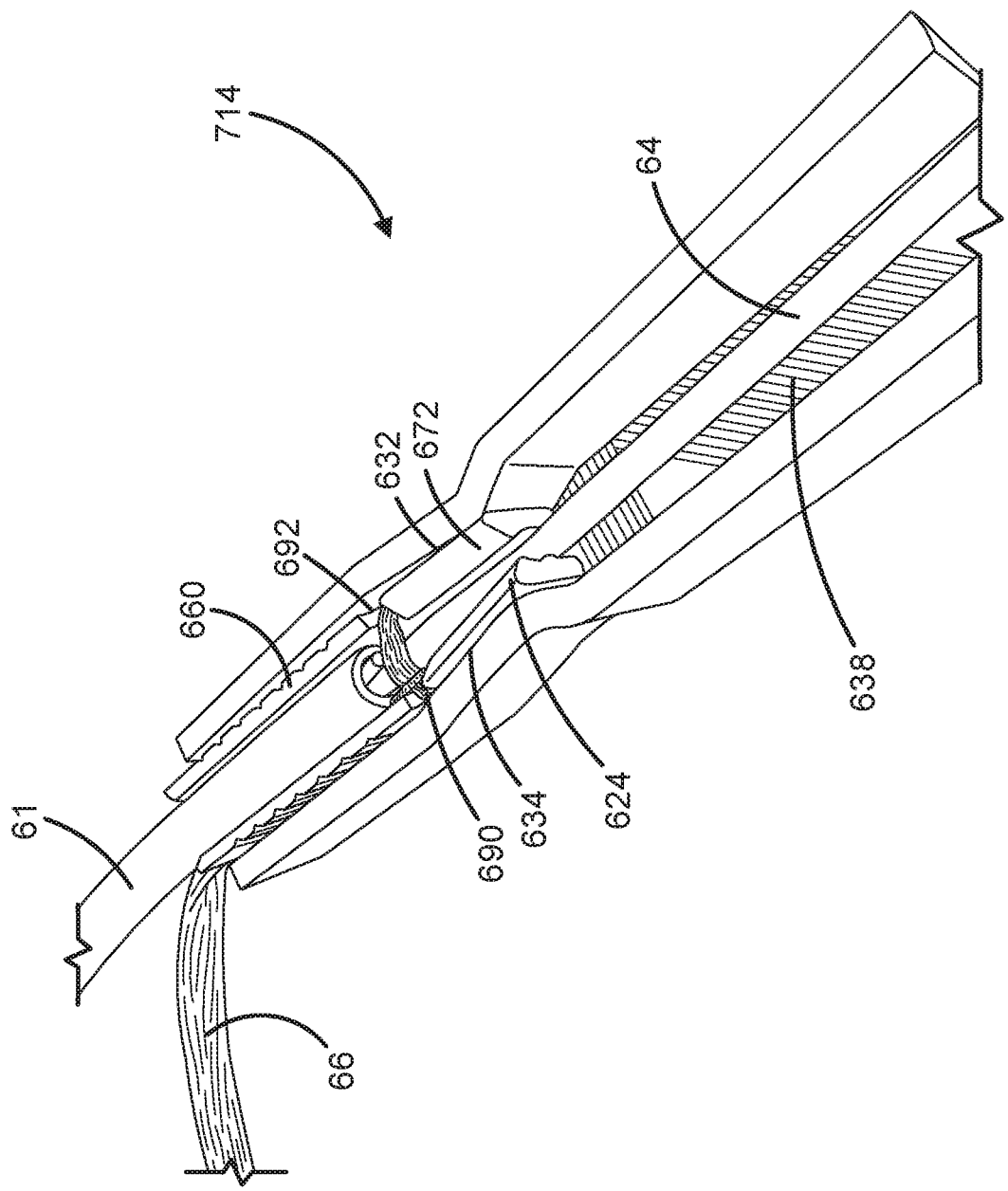
FIG. 42 depicts a further step of a method of anchoring a telecommunications cable strength member.

Referring to FIG. 37, a method step 704 is pictorially represented. The jacket 61 is loaded into the holder 604 to seat the jacket 61 on the seat defined by the holder. Referring to FIGS. 36-38, method steps 702, 704, and 706 are pictorially represented. The strength member 66 is anchored in both pairs of notches 690 and 692, forming at least one complete loop around the sheath 64 at the axial position of the notches 690 and 692. So as not to interfere with the flexing of the of cantilever member 640, the strength member 66 is passed through the void 694 in creating the loop around the sheath 64 and through the notches 690, 692. Referring to FIG. 39, a method step 708 is pictorially represented. The free end portion extending beyond the portion anchored to the notches 690, 692 is fed proximally through the through passage defined by the holder 604 along the jacket 61 and out the proximal end 697 of the holder 604. Referring to FIGS. 40-42, method steps 710, 712 and 714 are pictorially represented. Following step 708, the holder 604 is axially advanced within the receptacle 602 until the pawl 642 engages the appropriate tooth 652 whereby the ramps 632 and 634 cause the gripper arms 672 and 674 to grip the inner sheath with an appropriate amount of force to anchor the inner sheath without damaging it. In this manner, the inner sheath 64 and the strength member 66 can be anchored easily using the same assembly 600. Optionally, a portion or all of the strength member extending from the proximal end 697 of the holder 604 can be cut off or otherwise removed.

EXAMPLE EMBODIMENTS

According to a $1^{st}$ example embodiment, there is provided an assembly, comprising: one or more optical fibers; a fiber optic sheath radially surrounding the one or more optical fibers, the fiber optic sheath having an end beyond which the one or more optical fibers extend; and an adjustable fixation subassembly for fixing the fiber optic sheath, the subassembly comprising: a holder, the holder including a body defining a seat supporting the fiber optic sheath, and including a first coupler and a pair of gripper arms, the pair of gripper arms extending from the body; and a receptacle, the receptacle including a second coupler cooperating with the first coupler to connect the holder and the receptacle at one of a plurality of positions along a first axis; and a pair of walls, the walls having ramped portions engaging the gripper arms and flexing the gripping arms towards each other to grip an outer surface of the sheath.

According to a 2nd example embodiment, there is provide the 1st example embodiment, wherein the ramped portions define a neck region of the receptacle, and wherein the sheath axially extends from the seat to and beyond the neck region.

According to a 3rd example embodiment, there is provided the 1st or the 2nd example embodiment, wherein the sheath is a tube that loosely receives the one or more optical fibers.

According to a 4th example embodiment, there is provided any of the 1st through 3rd example embodiments, wherein the sheath is an outer jacket of an optical cable that holds the one or more optical fibers.

According to a 5th example embodiment, there is provided any of the 1st through 4th example embodiments, wherein an outer diameter of the sheath is in a range from about 900 microns to about 5 millimeters.

According to a 6th example embodiment, there is provided the 5th example embodiment, wherein an outer diameter of the sheath is in a range from about 1.5 millimeters to about 8 millimeters.

According to a 7th example embodiment, there is provided any of the 1st through 6th example embodiments, further comprising an optical fiber strength member, wherein the holder defines an optical fiber strength member anchor that anchors the optical fiber strength member.

According to an 8th example embodiment, there is provided the 7th example embodiment, wherein the strength member anchor includes pairs of notches on opposing sides of the holder.

According to a 9th example embodiment, there is provided the 7th or the 8th example embodiment, wherein the strength member includes aramid yarn.

According to a 10th example embodiment, there is provided any of the 1st through 9th example embodiments, further comprising a tray, wherein the receptacle is a component of the tray.

According to an 11th example embodiment, there is provided the 10th example embodiment, wherein the tray is a splice tray.

According to a 12th example embodiment, there is provided any of the 1st through 9th example embodiments, further comprising a fiber optic connection panel, wherein the receptacle is a component of the fiber optic connection panel.

According to a 13th example embodiment, there is provided any of the 1st through 9th example embodiments, further comprising telecommunications equipment adapted to provide active and/or passive fiber optic connectivity with the one or more optical fibers, wherein the receptacle is a component of the telecommunications equipment.

According to a 14th example embodiment, there is a provided a method of anchoring a strength member of a telecommunications cable, the strength member including an exposed portion extending beyond an end of a sheath of the telecommunications cable, the method comprising: providing a holder extending from a proximal end to a distal end along a first axis, the holder including a body defining a through passage extending between the proximal and distal ends and a seat for the sheath of the telecommunications cable, and including a first coupler and a pair of gripper arms, the pair of gripper arms extending from the body, the gripper arms defining, respectively, first and second pairs of notches on opposing sides of the holder; providing a receptacle, the receptacle including a second coupler adapted to cooperate with the first coupler to connect the holder and the receptacle at a plurality of positions along the first axis; loading the sheath into the holder; anchoring the strength member to the holder, the anchoring including: a first routing of a first portion of the exposed portion of the strength member through the first pair of notches and the second pair of notches such that at least one loop of the exposed portion of the strength member is formed, the at least one loop fully surrounding the first axis; and subsequent to the first routing, a second routing of a second portion of the exposed portion of the strength member through a portion of the thorough passage and out the one of the proximal end or distal end of the holder; and subsequent to the anchoring, coupling together the first and second couplers.

According to a 15th example embodiment, there is provided the 14th example embodiment, further comprising distally axially advancing the holder within the receptacle such that the gripper arms engage ramped portions of the receptacle, causing the gripper arms to grip a portion of the telecommunications cable extending distally from the sheath.

According to a 16th example embodiment, there is provided the 14th or 15th example embodiment, wherein the strength member comprises aramid yarn.

According to a 17th example embodiment, there is provided any of the 14th through 16th example embodiments, wherein the strength member is pressed between the sheath and the holder.

According to an 18th example embodiment, there is provided any of the 14th through 17th example embodiments, further comprising, subsequent to the coupling or subsequent to the anchoring, cutting off a third portion of the exposed portion of the strength member.

According to a 19th example embodiment, there is provided any of the 14th through 18th example embodiments, wherein the first coupler includes a cantilever member extending from the body, and wherein the at least one loop does not surround the cantilever member.

According to a 20th example embodiment, there is provided the 19th example embodiment, wherein the holder defines a void between the cantilever member and the first and second gripper arms, and wherein the first routing includes passing the first portion of the exposed portion of the strength member through the void.

Although in the foregoing description, terms such as "top" and "bottom," "upper" and "lower", "front" and "back," "side," and "proximal" and "distal" were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An adjustable fixation assembly for fixing a fiber optic sheath, the assembly comprising:
   a holder, the holder including a body defining a seat for the fiber optic sheath, and including a first coupler and a pair of gripper arms, the pair of gripper arms extending from the body; and
   a receptacle, the receptacle including:

a second coupler adapted to cooperate with the first coupler to connect the holder and the receptacle at a plurality of positions along a first axis; and a pair of walls, the walls having ramped portions adapted to engage the gripper arms to flex the gripper arms towards each other as the holder is axially advanced in the receptacle, wherein the receptacle is a component of an optical fiber splice tray.

2. The assembly of claim 1, wherein the fiber optic sheath that is fixable by the assembly is a tube that holds one or more optical fibers.

3. The assembly of claim 1, wherein the fiber optic sheath that is fixable by the assembly is an outer jacket of an optical cable that holds the one or more optical fibers.

4. The assembly of claim 1, wherein the assembly is adapted to grip a fiber optic sheath having a largest outer radial diameter in a range from about 1.5 millimeters to about 8 millimeters.

5. The assembly of claim 1, wherein the gripper arms define teeth projecting towards the first axis.

6. The assembly of claim 1, wherein the first coupler comprises a track protruding from the body, and the second coupler comprises a slot configured to slidingly receive the track parallel to the first axis.

7. The assembly of claim 6, wherein the track has a substantially T-shaped profile.

8. The assembly of claim 1, wherein the holder and the receptacle are lockable together at a plurality of predefined axial locking positions.

9. The assembly of claim 8, comprising at least one groove and a plurality of ribs or at least one rib and a plurality of grooves, wherein engagements of the at least one groove with the plurality of ribs, or engagements of the at least one rib with the plurality of grooves correspond to the predefined axial locking positions.

10. The assembly of claim 8, wherein the first coupler includes a pawl and the second coupler includes a plurality of axially spaced ratchet teeth, wherein the pawl and the plurality of spaced apart ratchet teeth are configured to cooperate in a ratcheting manner, and wherein engagements of the pawl with the ratcheting teeth correspond to the predefined locking positions.

11. The assembly of claim 10, wherein the pawl protrudes from a cantilever member of the holder.

12. The assembly of claim 11, wherein the first coupler comprises a track protruding from the body of the holder and the second coupler comprises a slot configured to slidingly receive the track parallel to the first axis, wherein the seat of the holder faces at least partially upwards, and wherein the body of the holder is positioned above the slot and the cantilever member is positioned below the slot when the holder and the receptacle are connected to each other.

13. The assembly of claim 1, wherein the holder comprises a first member and a second member pivotally coupled to each other with a hinge, the holder having a holding configuration in which the gripper arms oppose each other and are positioned to grip a fiber optic sheath, and a loading position in which the fiber optic sheath is loaded into the holder, wherein the holder is moveable between the holding configuration and the loading configuration by operation of the hinge.

14. The assembly of claim 13, wherein the hinge defines a pivot axis, the pivot axis being parallel to the first axis.

15. The assembly of claim 13, wherein the seat of the holder faces at least partially upwards when the holder is in the holding configuration, and wherein the hinge is positioned on a bottom of the body of the holder when the holder is in the holding configuration.

16. The assembly of claim 1, wherein portions of the gripper arms include compressible material having a durometer in a range from about 20 to about 80 on a Shore 00 scale.

17. The assembly of claim 1, wherein the gripper arms include first portions extending from the body and second portions extending from the first portions to free ends of the gripper arms, the second portions comprising a different material than the first portions, the different material being a compressible material having a durometer in a range from about 20 to about 80 on a Shore 00 scale.

18. The assembly of claim 16, wherein the compressible material includes rubber or silicone.

19. The assembly of claim 1, wherein the holder defines an optical fiber strength member anchor.

20. The assembly of claim 19, wherein the strength member anchor includes pairs of notches on opposing sides of the holder adapted to grippingly receive aramid yarn from a fiber optic cable.

21. A method of fixing a fiber optic sheath to a receptacle comprising:

providing a holder, the holder including a body defining a seat for the fiber optic sheath, and including a first coupler and a pair of gripper arms, the pair of gripper arms extending from the body;

providing a receptacle, the receptacle including:
a second coupler adapted to cooperate with the first coupler to connect the holder and the receptacle at a plurality of positions along a first axis; and
a pair of walls, the walls having ramped portions adapted to engage the gripper arms to flex the gripper arms towards each other as the holder is axially advanced in the receptacle;

loading the sheath into the holder;

coupling together the first and second couplers; and axially advancing the holder relative to the receptacle without rotating the holder relative to the receptacle until the pair of gripper arms grip an exterior surface of the sheath.

22. The method of claim 21, further comprising anchoring a fiber optic cable strength member to a strength member anchor defined by the holder, wherein the holder extends from a proximal end to a distal end, the gripper arms extending distally from the body, wherein the strength member anchor includes notches on opposing sides of the holder, and wherein the anchoring includes a first routing of the strength member through the notches and a second routing of the strength member, subsequent to the first routing, proximally through the proximal end of the holder.

23. An adjustable fixation assembly for fixing a fiber optic sheath, the assembly comprising:

a holder, the holder including a body defining a seat for the fiber optic sheath, and including a first coupler and a pair of gripper arms, the pair of gripper arms extending from the body; and a receptacle, the receptacle including:
a second coupler adapted to cooperate with the first coupler to connect the holder and the receptacle at a plurality of positions along a first axis; and
a pair of walls, the walls having ramped portions adapted to engage the gripper arms to flex the gripper arms towards each other as the holder is axially advanced in the receptacle, wherein the holder and the receptacle are lockable together at a plurality of predefined axial locking positions.

24. The assembly of claim 23, comprising at least one groove and a plurality of ribs or at least one rib and a plurality of grooves, wherein engagements of the at least one groove with the plurality of ribs, or engagements of the at least one rib with the plurality of grooves correspond to the predefined axial locking positions.

25. The assembly of claim 23, wherein the first coupler includes a pawl and the second coupler includes a plurality of axially spaced ratchet teeth, wherein the pawl and the plurality of spaced apart ratchet teeth are configured to cooperate in a ratcheting manner, and wherein engagements of the pawl with the ratcheting teeth correspond to the predefined locking positions.

26. The assembly of claim 25, wherein the pawl protrudes from a cantilever member of the holder.

27. The assembly of claim 26, wherein the first coupler comprises a track protruding from the body of the holder and the second coupler comprises a slot configured to slidingly receive the track parallel to the first axis, wherein the seat of the holder faces at least partially upwards, and wherein the body of the holder is positioned above the slot and the cantilever member is positioned below the slot when the holder and the receptacle are connected to each other.

28. An adjustable fixation assembly for fixing a fiber optic sheath, the assembly comprising:

a holder, the holder including a body defining a seat for the fiber optic sheath, and including a first coupler and a pair of gripper arms, the pair of gripper arms extending from the body; and a receptacle, the receptacle including:
    a second coupler adapted to cooperate with the first coupler to connect the holder and the receptacle at a plurality of positions along a first axis; and
    a pair of walls, the walls having ramped portions adapted to engage the gripper arms to flex the gripper arms towards each other as the holder is axially advanced in the receptacle, wherein the holder comprises a first member and a second member pivotally coupled to each other with a hinge, the holder having a holding configuration in which the gripper arms oppose each other and are positioned to grip a fiber optic sheath, and a loading position in which the fiber optic sheath is loaded into the holder, wherein the holder is moveable between the holding configuration and the loading configuration by operation of the hinge.

29. The assembly of claim 28, wherein the hinge defines a pivot axis, the pivot axis being parallel to the first axis.

30. The assembly of claim 28, wherein the seat of the holder faces at least partially upwards when the holder is in the holding configuration, and wherein the hinge is positioned on a bottom of the body of the holder when the holder is in the holding configuration.

* * * * *